US011617205B2

(12) United States Patent
Abotabl et al.

(10) Patent No.: US 11,617,205 B2
(45) Date of Patent: Mar. 28, 2023

(54) CHANNEL SENSING FOR FULL-DUPLEX SIDELINK COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 17/231,985

(22) Filed: Apr. 15, 2021

(65) Prior Publication Data
US 2022/0338255 A1 Oct. 20, 2022

(51) Int. Cl.
H04W 74/08 (2009.01)
H04W 76/14 (2018.01)
(Continued)

(52) U.S. Cl.
CPC ........... H04W 74/0808 (2013.01); H04L 5/14 (2013.01); H04W 74/006 (2013.01); H04W 76/14 (2018.02)

(58) Field of Classification Search
CPC ............ H04W 74/0808; H04W 76/14; H04W 72/1263; H04W 72/0493; H04W 52/383;
(Continued)

(56) References Cited

U.S. PATENT DOCUMENTS

2018/0212746 A1 7/2018 Kazmi et al.
2020/0112400 A1\* 4/2020 Lee ...................... H04L 5/0055
(Continued)

FOREIGN PATENT DOCUMENTS

WO WO-2019149117 A1 \* 8/2019 ........... H04L 5/0008
WO WO-2020069182 A1 4/2020

OTHER PUBLICATIONS

International Search Report and Written Opinion—PCT/US2022/017682—ISA/EPO—dated Jun. 8, 2022.

Primary Examiner — Ayaz R Sheikh
Assistant Examiner — Louis Samara
(74) Attorney, Agent, or Firm — Holland & Hart LLP

(57) ABSTRACT

Methods, systems, and devices for wireless communications are described. In some cases, a sidelink user equipment (UE) may receive a configuration for performing a channel sensing procedure of a sidelink resource selection procedure for identifying sidelink resource candidates in a resource selection window. The configuration may indicate a first channel metric and a second channel metric for performing the channel sensing procedure. The UE may measure reference signaling in a sensing window according to one or both of the first and second channel metrics based on a duplex mode of the UE while performing the channel sensing. The reference signaling may correspond to a set of sidelink resource candidates in a resource selection window. The UE may determine an available set of sidelink resource candidates for a sidelink transmission from the set of sidelink resource candidates based on the measuring.

30 Claims, 11 Drawing Sheets

(51) Int. Cl.
*H04L 5/14* (2006.01)
*H04W 74/00* (2009.01)

(58) Field of Classification Search
CPC ...... H04W 72/048; H04L 5/14; H04L 1/0026;
H04L 5/0055; H04B 7/088; H04B 17/24
See application file for complete search history.

(56) References Cited

U.S. PATENT DOCUMENTS

| | | | |
|---|---|---|---|
| 2020/0389257 A1* | 12/2020 | Kung | H04B 17/24 |
| 2021/0050888 A1* | 2/2021 | Manolakos | H04B 7/088 |
| 2021/0105055 A1* | 4/2021 | Chae | H04L 1/0026 |
| 2021/0329648 A1* | 10/2021 | Osawa | H04W 72/0493 |
| 2021/0368372 A1* | 11/2021 | Chen | H04W 76/14 |
| 2022/0110074 A1* | 4/2022 | Zhao | H04W 52/383 |
| 2022/0174690 A1* | 6/2022 | Wang | H04W 72/1263 |
| 2022/0322301 A1* | 10/2022 | Kiilerich Pratas | H04W 72/048 |

* cited by examiner

CHANNEL SENSING FOR FULL-DUPLEX SIDELINK COMMUNICATIONS

FIELD OF TECHNOLOGY

The following relates to wireless communications, including channel sensing for full-duplex sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may perform a sidelink resource selection procedure to identify available sidelink resources. The UE may perform channel sensing in a sensing window to identify and select available resources in a corresponding resource selection window for performing a sidelink transmission. In some examples, the UE may transmit sidelink data, uplink data, or both, while performing channel sensing.

SUMMARY

The described techniques relate to improved methods, systems, devices, and apparatuses that support channel sensing for full-duplex sidelink communications. Generally, the described techniques provide for a user equipment (UE) to perform a channel sensing procedure while operating in a full-duplex mode. The UE may receive a configuration for performing the channel sensing procedure. The channel sensing procedure may be part of a sidelink resource selection procedure for identifying sidelink resource candidates in a resource selection window. The configuration may indicate a first channel metric and a second channel metric for performing the channel sensing procedure. The UE may measure reference signaling in a sensing window according to one or both of the first channel metric and the second channel metric based on a duplex mode of the UE while performing the channel sensing. For example, if the UE transmits while performing channel sensing (e.g., a full-duplex mode), the UE may measure the reference signaling according to both the first and second channel metrics to account for the UE's own transmission. If the UE does not transmit while performing channel sensing (e.g., a half-duplex mode), the UE may measure the reference signaling according to the first channel metric. The reference signaling may correspond to a set of sidelink resource candidates in a resource selection window, and the UE may determine an available set of sidelink resource candidates from the set of sidelink resource candidates based on the measuring. The UE may select one or more resources of the available set of sidelink resource candidates for performing a sidelink transmission.

A method for wireless communications at a UE is described. The method may include receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric, measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window, determining an available set of sidelink resource candidates from the set of sidelink resource candidates based on the measuring, and transmitting a sidelink message using one or more resources of the available set of sidelink resource candidates.

An apparatus for wireless communications at a UE is described. The apparatus may include a processor, memory coupled with the processor, and instructions stored in the memory. The instructions may be executable by the processor to cause the apparatus to receive control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric, measure reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window, determine an available set of sidelink resource candidates from the set of sidelink resource candidates based on the measuring, and transmit a sidelink message using one or more resources of the available set of sidelink resource candidates.

Another apparatus for wireless communications at a UE is described. The apparatus may include means for receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric, means for measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window, means for determining an available set of sidelink resource candidates from the set of sidelink resource candidates based on the measuring, and means for transmitting a sidelink message using one or more resources of the available set of sidelink resource candidates.

A non-transitory computer-readable medium storing code for wireless communications at a UE is described. The code may include instructions executable by a processor to receive control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric, measure reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window, determine an available set of sidelink resource candidates from the set of sidelink resource candidates based on the measuring, and transmit a sidelink message using one or more resources of the available set of sidelink resource candidates.

In some examples of the method, apparatuses, and non-transitory computer-readable medium described herein, the configuration further indicates a first threshold value corresponding to the first channel metric and a second threshold value corresponding to the second channel metric.

In some examples of the method, apparatuses, and non-transitory computer-readable medium described herein, determining the available set of sidelink resource candidates may include operations, features, means, or instructions for determining that the duplex mode of the UE includes a full-duplex mode while measuring the reference signaling in the sensing window, measuring the reference signaling according to the first channel metric to obtain a first measurement based on the full-duplex mode of the UE, where the first measurement is below the first threshold value, and determining the available set of sidelink resource candidates based on the first channel metric and the first measurement being below the first threshold value.

In some examples of the method, apparatuses, and non-transitory computer-readable medium described herein, determining the available set of sidelink resource candidates may include operations, features, means, or instructions for determining that the duplex mode of the UE includes a full-duplex mode while measuring the reference signaling in the sensing window, measuring the reference signaling according to the first channel metric to obtain a first measurement based on the full-duplex mode of the UE, where the first measurement exceeds the first threshold value, measuring the reference signaling according to the second channel metric to obtain a second measurement based on the first measurement exceeding the first threshold value, and determining the available set of sidelink resource candidates based on the first channel metric and the second channel metric.

In some examples of the method, apparatuses, and non-transitory computer-readable medium described herein, the configuration may further indicate a threshold quantity of available sidelink resource candidates, and determining the available set of sidelink resource candidates may include operations, features, means, or instructions for determining a quantity of sidelink resource candidates in the available set of sidelink resource candidates is less than the threshold quantity, adjusting the first threshold value, the second threshold value, or both, based on determining the quantity of sidelink resource candidates is less than the threshold quantity, and determining a second available set of sidelink resource candidates from the set of sidelink resource candidates based on the adjusted first threshold value, the adjusted second threshold value, or both, where the second available set of sidelink resource candidates includes at least the available set of sidelink resource candidates.

In some examples of the method, apparatuses, and non-transitory computer-readable medium described herein, the configuration further indicates a first threshold value for the first channel metric corresponding to a first duplex mode of the UE and a second threshold value for the first channel metric corresponding to a second duplex mode of the UE.

In some examples of the method, apparatuses, and non-transitory computer-readable medium described herein, the first duplex mode of the UE includes a full-duplex mode while measuring the reference signaling in the sensing window and the second duplex mode of the UE includes a half-duplex mode while measuring the reference signaling in the sensing window.

In some examples of the method, apparatuses, and non-transitory computer-readable medium described herein, the configuration further indicates an interference cancellation configuration for performing the channel sensing procedure.

In some examples of the method, apparatuses, and non-transitory computer-readable medium described herein, the configuration further indicates a first threshold value corresponding to the first channel metric and a second threshold value corresponding to the second channel metric and the interference cancellation configuration indicates a third threshold value corresponding to the first channel metric and a fourth threshold value corresponding to the second channel metric, the third threshold value and the fourth threshold value associated with an interference cancellation procedure performed by the UE in the sensing window.

In some examples of the method, apparatuses, and non-transitory computer-readable medium described herein, determining the available set of sidelink resource candidates may include operations, features, means, or instructions for performing interference cancellation in the sensing window in accordance with a first duplex mode, where the first duplex mode includes a full-duplex mode while measuring the reference signaling in the sensing window and determining the available set of sidelink resource candidates in accordance with the interference cancellation configuration and performing an interference cancellation procedure.

In some examples of the method, apparatuses, and non-transitory computer-readable medium described herein, the interference cancellation configuration indicates refraining from performing the channel sensing procedure when the duplex mode of the UE includes a full-duplex mode while measuring the reference signaling in the sensing window and when interference cancellation at the UE may be disabled.

In some examples of the method, apparatuses, and non-transitory computer-readable medium described herein, the first channel metric corresponds to a reference signal received power (RSRP) and the second channel metric corresponds to a signal-to-interference-plus-noise ratio (SINR).

In some examples of the method, apparatuses, and non-transitory computer-readable medium described herein, measuring the reference signaling may include operations, features, means, or instructions for receiving, in the sensing window, sidelink control information corresponding to the reference signaling and measuring the sidelink control information (SCI) corresponding to the reference signaling in accordance with the first channel metric, the second channel metric, or both.

DETAILED DESCRIPTION

Figure 1:
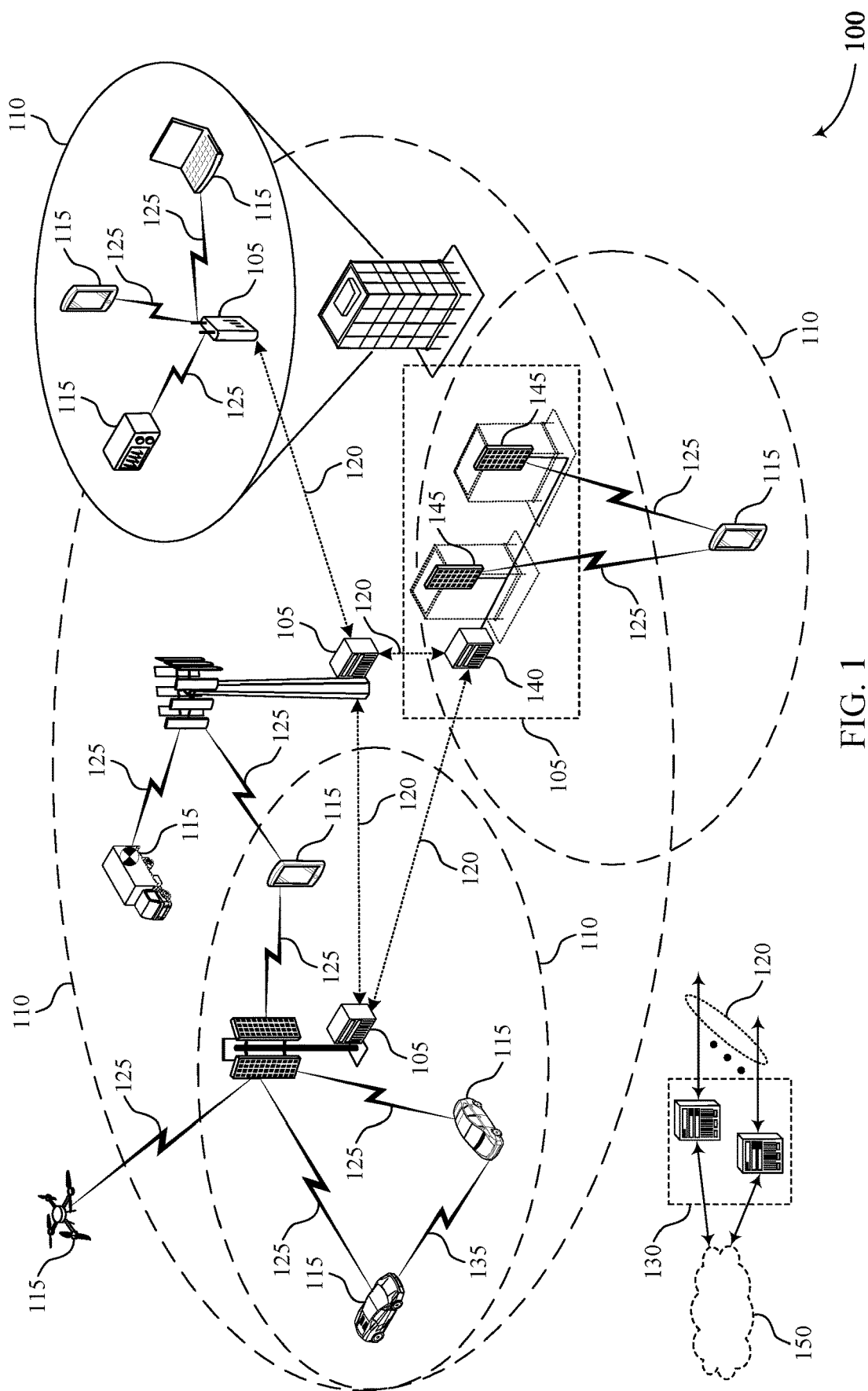
FIG. 1 illustrates an example of a wireless communications system that supports channel sensing for full-duplex sidelink communications in accordance with aspects of the present disclosure.

Some wireless communications systems may support a sidelink resource allocation mode (e.g., sidelink resource allocation mode 2) in which one or more user equipments (UEs) may autonomously perform channel sensing to select or reserve resources for a sidelink transmission. To perform channel sensing, a UE may measure reference signaling received via one or more resources within a sensing window according to a signal metric level (e.g., a reference signal received power (RSRP) level). The reference signaling may correspond to sidelink control information (SCI) transmitted by another UE in the sensing window, and the SCI may reserve one or more resources in a corresponding resource selection window. The UE may exclude or include the one or more resources from a set of available resource candidates based on the measured signal metric level of the corresponding reference signaling. In some cases, a UE that supports full-duplex communications may transmit signals during the sensing window, which may affect (e.g., increase) the measured RSRP level of the reference signaling and may result in reduced reliability and efficiency of the sidelink channel sensing operation.

A UE as described herein may be configured with a first channel metric and a second channel metric for performing channel sensing and resource reservation. The UE may measure reference signaling in a sensing window according to the first channel metric (e.g., a RSRP metric), the second channel metric (e.g., a signal-to-interference-plus-noise ratio (SINR) metric), or both, based on a duplex mode of the UE during the sensing window. The duplex mode may correspond to whether the UE performs a transmission while monitoring resources in the sensing window. If the UE transmits in the sensing window (e.g., a full-duplex mode), the UE may measure the reference signaling according to both the first and second channel metrics to obtain an accurate measurement of the reference signaling that accounts for the UE's own transmission. The UE may be configured with first and second threshold values corresponding to the first and second metrics, respectively. If a first measurement of the reference signaling according to the first metric is below the first threshold value, the UE may determine the resources associated with the reference signaling are available regardless of a transmission state of the UE. If the first measurement is above the first threshold value, the UE may determine availability based on a comparison of a second measurement of the reference signaling according to the second metric with the second threshold value, which may increase a reliability of the channel sensing procedure by accounting for interference that may result from the UE's transmission.

The UE may or may not perform interference cancellation while operating in a full-duplex mode to reduce interference caused by the full-duplex communications. In some examples, the UE may be configured with the first and second threshold values to use for the channel sensing procedure if the UE does not perform interference cancellation in the sensing window and with third and fourth threshold values to use for the channel sensing procedure if the UE performs interference cancellation in the sensing window. Additionally or alternatively, the UE may be configured to drop channel sensing if the UE operates in a full-duplex mode and does not apply interference cancellation in the sensing window.

Aspects of the disclosure are initially described in the context of wireless communications systems. Additional aspects are described with reference to channel sensing schemes and process flows. Aspects of the disclosure are further illustrated by and described with reference to apparatus diagrams, system diagrams, and flowcharts that relate to channel sensing for full-duplex sidelink communications.

FIG. 1 illustrates an example of a wireless communications system 100 that supports channel sensing for full-duplex sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive a configuration from a base station 105 for performing a channel sensing procedure while operating in a full-duplex mode. The channel sensing procedure may be part of a sidelink resource selection procedure for identifying sidelink resource candidates in a resource selection window. The configuration may indicate a first channel metric and a second channel metric for performing the channel sensing procedure. The UE 115 may measure reference signaling in a sensing window according to one or both of the first channel metric and the second channel metric based on a duplex mode of the UE 115 while performing the channel sensing. For example, if the UE 115 transmits while performing channel sensing (e.g., a full-duplex mode), the UE 115 may measure the reference signaling according to both the first and second channel metrics. The reference signaling may correspond to a set of sidelink resource candidates in a resource selection window, and the UE 115 may determine an available set of sidelink resource candidates from the set of sidelink resource candidates based on the measuring. The UE 115 may select one or more of the available set of sidelink resources, and the UE 115 may transmit a sidelink message to another UE 115 (e.g., via a D2D communication link 135) using the selected resources.

Figure 2:
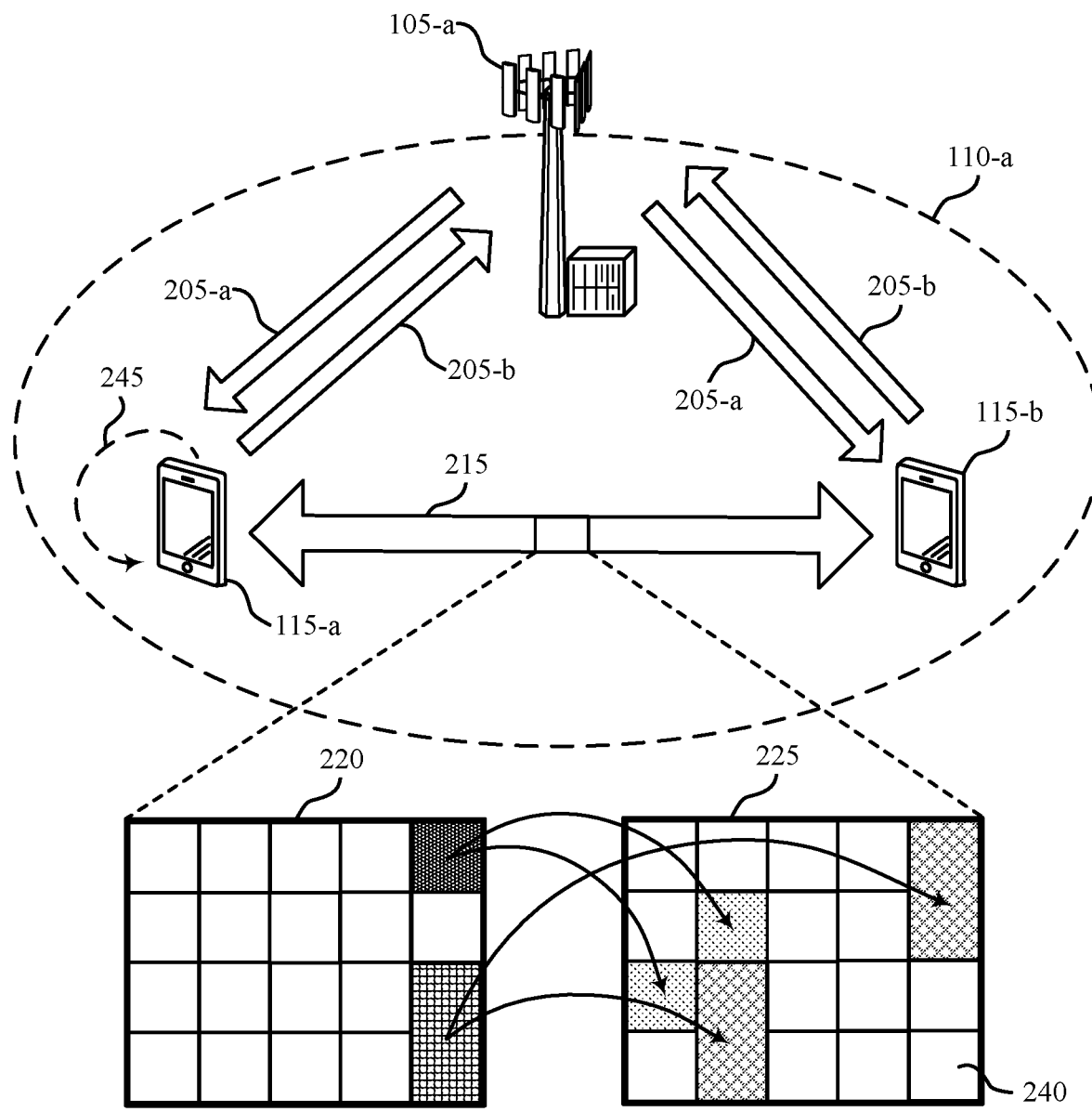
FIG. 2 illustrates an example of a wireless communications system that supports channel sensing for full-duplex sidelink communications in accordance with aspects of the present disclosure.

FIG. 2 illustrates an example of a wireless communications system 200 that supports channel sensing for full-duplex sidelink communications in accordance with aspects of the present disclosure. The wireless communications system 200 may include a base station 105-a, a UE 115-a, and a UE 115-b, which may be examples of a base station 105 and UEs 115 as described with reference to FIG. 1. In some examples, the base station 105-a, the UE 115-a, and the UE 115-a may be located in a geographic coverage area 110-a. The base station may communicate with the UE 115-a and the UE 115-b via downlink communication links 205-a and uplink communication links 205-b. Additionally, the UE 115-a may communicate with the UE 115-b via a sidelink communication link 215 (e.g., a PC5 link). In some examples, one or both of the UE 115-a and the UE 115-a may perform a resource selection procedure which may include sensing in a sensing window 220 and reserving sidelink resources in a resource selection window 225 based on the sensing.

Sidelink communication may be described as communication between two or more wireless devices (e.g., communication between the UE 115-a and the UE 115-b). To facilitate sidelink communication, the UE 115-a and the UE 115-b may be configured with a set of resources (e.g., time and frequency resources) allocated for sidelink communication within one or more sidelink resource pools. A sidelink resource pool may include one or more subchannels in a frequency domain and one or more slots in a time domain. That is, the sidelink resource pool may include multiple resource elements 240.

In some examples, sidelink communication between the UE 115-a and the UE 115-b may be scheduled according to a sidelink resource allocation mode 1. During the sidelink resource allocation mode 1, the base station 105-a may indicate a set of resources within the one or more sidelink resource pools to a transmitting UE 115, and the transmitting UE 115 may utilize the set of resources for sidelink transmissions. For example, the base station 105-*a* may transmit, to the UE 115-*a* (e.g., a transmitting UE 115-*a*), an indication of a set of resources to use to transmit a message to the UE 115-*b*, and the UE 115-*a* may utilize one or more resources of the set to transmit the message to the UE 115-*b*. Alternatively, a transmitting UE 115, such as the UE 115-*a*, may select resources for sidelink transmissions according to a sidelink resource allocation mode 2. During the sidelink resource allocation mode 2, the UE 115-*a* may select a set of resources from the one or more sidelink resource pools for sidelink transmissions autonomously (without signaling from the base station 105-*a*). In either case, the UE 115-*a* may transmit SCI to the UE 115-*b* indicating the selected set of resources such that the UE 115-*b* may locate and decode transmissions from the UE 115-*a*. As such, resource selection may vary between the sidelink resource allocation modes 1 and 2.

When a transmitting UE 115, such as the UE 115-*a*, is operating in sidelink resource allocation mode 2, the transmitting UE 115-*a* may perform a channel sensing procedure. In some examples, the UE 115-*a* may perform channel sensing in the sensing window 220. The sensing window 220 may be associated with the resource selection window 225. The resource selection window 225 may be subsequent to the sensing window 220 in a time domain and may include a set of resource candidates (e.g., resources that the transmitting UE 115-*a* may potentially transmit on). One or more of the resource candidates may be reserved for sidelink communication by one or more other UEs 115. As such, the UE 115-*a* may perform channel sensing during the sensing window 220 to determine an available set of resource candidates in the resource selection window 225. Sensing may refer to the UE 115-*a* monitoring for reference signaling on resource elements 240 of the sensing window 220. For example, the UE 115-*a* may monitor for SCI of other UEs 115 received on sidelink control resources 230. Decoding SCI of other UEs 115 may inform the UE 115-*a* which resources of the resource candidates in the resource selection window 225 are reserved for transmission by other UEs 115 (e.g., the reserved resources 235). In some examples, the UE 115-*a* may determine that all resources of the resource selection window 225 excluding the reserved resources 235 are available. The UE 115-*a* may additionally or alternatively measure a channel metric (e.g., a RSRP) associated with the SCI transmitted by other UEs 115 to determine whether the corresponding reserved resources 235 may be available for a transmission by the UE 115-*a*. If the UE 115-*a* determines that the measured signal strength of reference signaling corresponding to a reserved resource 235 is below a threshold, the UE 115-*a* may include the resource in the available set of resource candidates (e.g., the scheduled transmission in the reserved resource 235 may not interfere with a transmission by the UE 115-*a*). In some examples, the UE 115-*a* may increase or decrease the threshold based on a percentage of available resources in the resource selection window 225 or a priority associated with the scheduled transmission by the UE 115-*a*.

Once the UE 115-*a* determines the available resources, a physical layer may indicate the available resources to higher layers, and the higher layers may perform resource selection and reservation. In some examples, the selected resources may be reserved for a sidelink message, a retransmission of a sidelink message, or both. The UE 115-*a* may select and reserve resources such that all retransmission for a sidelink packet may occur within a configured delay period (e.g., a packet delay budget (PDB)). The UE 115-*a* may select the resources from the available set of resource candidates in response to receiving a resource selection trigger (e.g., an indication the UE 115-*a* has data to transmit). The duration from the start of the sensing window 220 and the resource selection trigger may be configured (e.g., 100 ms, 1100 ms, or some other duration). In some examples, the UE 115-*a* and the UE 115-*b* may confirm resource availability some time before the resource selection window 225 and the duration between the resource selection trigger to the end of the resource selection window 225 may be configured based on a priority and a sub-carrier spacing (SCS) (e.g., 15 kHz, 30 kHz, 60 kHz, 120 kHz, or some other SCS value).

In some examples, a sidelink UE 115 may support one or more duplex modes, which may correspond to whether the UE 115 transmits, receives, or both, at a time. For example, the UE 115-*a*, the UE 115-*b*, or both, may operate according to a half-duplex mode or a full-duplex mode. In a half-duplex mode, the UE 115-*a* may transmit and receive in different time resources. In a full-duplex mode, the UE 115-*a* may transmit and receive concurrently (e.g., in the same or overlapping time resources) using two or more antenna panels at the UE. Some full-duplex communications (e.g., in-band full-duplex) may correspond to transmission and reception on the same time and frequency resources. For example, resources allocated for a transmission by the UE 115-*a* may overlap in time and frequency with resources allocated for a reception by the UE 115-*a* (e.g., partial overlap or full overlap within the time and frequency resource). Other full-duplex communications (e.g., sub-band full-duplex) may correspond to transmission and reception at the same time (e.g., in the same time resources, such as a same slot), but in different frequency resources. For example, a resource allocated for a transmission by the UE 115-*a* may be separated from a resource allocated for reception by the UE 115-*a* in the frequency domain (e.g., in separate frequency bands), but may occur within a same slot in the time domain. In some examples, a guard band may be allocated between sub-band full-duplex resources in the frequency domain.

The UE 115-*a* may include one or more panels (e.g., transmission reception points (TRPs)) for simultaneous transmission and reception. For example, during full-duplex communications (e.g., sub-band full-duplex or in-band full-duplex) a first panel may be used for downlink reception and a second panel may be used for uplink transmission. In some examples, each panel may correspond to different frequency bands or different portions of a frequency band (e.g., for sub-band full-duplex). If the UE 115-*a* operates in a half-duplex mode, the first and second panels may both be allocated for transmission or reception at a time.

In some examples, the sensing window 220 may be located in one or more full-duplex slots. As such, the UE 115-*a* may monitor for and receive reference signaling in the sensing window 220, and the UE 115-*a* may additionally or alternatively transmit uplink data, sidelink data, or both, in the sensing window 220. Simultaneously transmitting and sensing may introduce interference 245 at the UE 115-*a*, which may negatively impact the sensing procedure. That is, the interference 245 may result in an inaccurate signal strength measurement associated with the reference signaling. For example, the interference 245 may increase an RSRP measurement, and the UE 115-*a* may incorrectly assume that fewer resources are available than if the interference 245 did not affect the measurement.

To reduce effects of the interference 245 on the channel sensing procedure, a UE 115 as described herein may be configured with two or more channel metrics to use for performing channel sensing. For example, base station 105-*a* may transmit a configuration to UE 115-*a* that indicates the two or more channel metrics. In some examples, a first channel metric may correspond to an RSRP and a second channel metric may correspond to a SINR. The configuration may further indicate a respective threshold value corresponding to each of the respective channel metrics. That is, the UE 115-*a* may be configured with a first threshold value corresponding to the first channel metric (e.g., RSRP) and a second threshold value corresponding to the second channel metric (e.g., SINR). The UE 115-*a* may measure reference signaling received in the sensing window 220 according to the first channel metric to obtain a first measurement, according to the second channel metric to obtain a second measurement, or both, depending on a duplex mode of the UE 115-*a*. The UE 115-*a* may compare the first measurement with the first threshold, the second measurement with the second threshold, or both, to determine an available set of sidelink resource candidates in the corresponding resource selection window 225.

The UE 115-*a* may obtain a more accurate measurement of the reference signaling by performing channel sensing according to two or more channel metrics than according to one channel metric. For example, the interference 245 experienced by the UE 115-*a* operating in a full-duplex mode while monitoring reference signaling in the sensing window 220 may result in a greater RSRP level measured by the UE 115-*a* and a lower SINR level measured by the UE 115-*a* than the corresponding measurements without the interference 245. Accordingly, if the first channel metric corresponds to RSRP and the second channel metric corresponds to SINR, the UE 115-*a* may utilize both metrics to identify the effects of the interference 245 and to accurately determine whether a resource is available. That is, the two channel metrics may account for the UE's own transmission. In some examples, one or more other channel metrics may be configured for the UE 115-*a*.

The UE 115-*a* may measure the reference signaling according to the first channel metric to obtain the first measurement before measuring the reference signaling according to the second channel metric. If the first measurement is below the first threshold, the UE 115-*a* may determine that the corresponding resources are available (e.g., if the interference 245 occurs, the interference 245 will increase the first measurement, but the interference 245 will not decrease the first measurement). If the first measurement is equal to or greater than the first threshold, the UE 115-*a* may measure the reference signaling according to the second channel metric to obtain the second measurement. If the second measurement is greater than the second threshold, the UE 115-*a* may determine that the corresponding resources (e.g., one or more reserved resources 235 in the resource selection window 225) are available. If the second measurement is less than or equal to the second threshold, the UE 115-*a* may determine that the corresponding resources are not available.

In some examples, the UE 115-*a* may apply one or more interference cancellation techniques to reduce the interference 245, and the base station 105-*a* may transmit an interference cancellation configuration (e.g., a RRC configuration) to the UE 115-*a* for performing channel sensing. The interference cancellation configuration may indicate different threshold values for performing the channel sensing with interference cancellation and without interference cancellation, or the interference cancellation configuration may instruct the UE 115-*a* to drop channel sensing if interference cancellation is not applied. Aspects of the channel sensing configuration, the interference cancelation configuration, and the corresponding channel metrics are described in further detail elsewhere herein, including with reference to FIG. 3.

Accordingly, a sidelink UE 115 as described herein may be configured with two or more channel metrics for performing channel sensing and resource selection according to a sidelink resource allocation mode 2. The UE 115 may determine whether to use one or more of the channel metrics for channel sensing based on a duplex mode of the UE 115, which may correspond to whether the UE 115 is transmitting during a sensing window 220 or not. As such, the channel metrics may support improved channel sensing while accounting for interference 245 resulting from full-duplex communications by the UE 115 in the sensing window 220.

Figure 3:
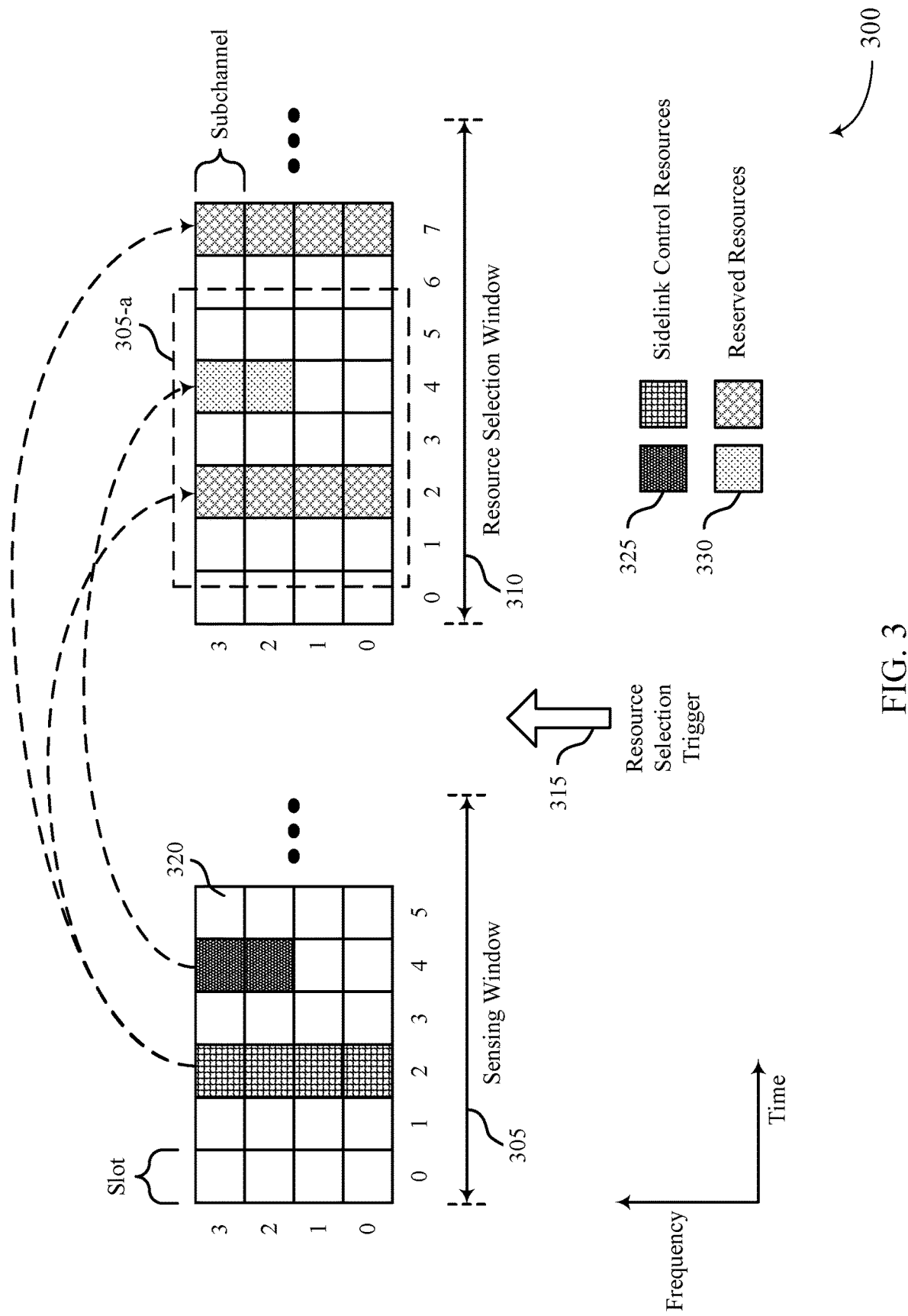
FIG. 3 illustrates an example of a channel sensing scheme that supports channel sensing for full-duplex sidelink communications in accordance with aspects of the present disclosure.

FIG. 3 illustrates an example of a channel sensing scheme 300 that supports channel sensing for full-duplex sidelink communications in accordance with aspects of the present disclosure. In some examples, the channel sensing scheme 300 may represent a scheme used by a UE 115 (e.g., a transmitting UE 115) to perform channel sensing and select sidelink resources for transmitting a sidelink message, as described with reference to FIG. 2. The UE 115 may communicate with one or more other UEs 115 using resource elements 320 (e.g., time and frequency resources) in a resource pool over a sidelink channel. The UE 115 and the one or more other UEs 115 may be examples of the UEs 115 described with reference to FIGS. 1 and 2. In some examples, the UE 115 may be configured with two or more channel metrics for performing channel sensing and resource selection.

As described with reference to FIG. 2, Some sidelink communications (e.g., V2X communications, or other device-to-device communications) may support autonomous resource allocation by a UE 115 (e.g., a mode 2 resource allocation). In such cases, the UE 115 (e.g., a transmitting UE 115) may access a channel based on sensing outcomes. For example, the UE 115 may identify available resources (e.g., time and frequency resources, such as resource elements 320) of a resource pool for a sidelink transmission based on a channel sensing procedure performed in a sensing window 305. If the UE 115 receives a resource selection trigger 315 (e.g., an indication from a higher layer that the UE 115 has sidelink data to transmit) after performing channel sensing, the UE 115 may select one or more resources from an available set of resource candidates in a corresponding resource selection window 310 for performing the sidelink transmission to one or more other UEs 115. The UE 115 may transmit a sidelink message to one or more other UEs 115 in the selected resources.

In the example of the channel sensing scheme 300, the UE 115 may monitor each resource element 320 (e.g., each slot and subchannel) during the sensing window 305 to identify an available set of resource candidates within the corresponding resource selection window 310. The resource selection window 310 may include a set of resource candidates, some of which may be reserved for communications by one or more other UEs 115 (e.g., the reserved resources 330), as described with reference to FIG. 2. The UE 115 may identify the available set of resource candidates from the set of resource candidates based on a measured channel metric level of corresponding reference signaling, SCI, or both, received by the UE 115 within one or more of the sidelink control resources 325 in the sensing window 305.

In some cases, the UE 115 may operate in a full-duplex mode while performing channel sensing. The full-duplex mode may correspond to the UE 115 performing a transmission (e.g., an uplink transmission, a sidelink transmission, or both) during the sensing window 305 while measuring the reference signaling (e.g., concurrent uplink and downlink communications). The UE 115 may experience self-interference, or other types of interference due to the full-duplex communications, which may provide for an inaccurate channel metric measurement. For example, the interference may result in an increased value of a measured channel metric level, such as a RSRP measurement. In some examples, a sensing window 305 may overlap with a resource selection window 310 for the UE 115. For example, the second sensing window 305-*a* illustrated in FIG. 3 may overlap with one or more resource elements 320 of the resource selection window 310. In such cases, the UE 115 may perform a scheduled transmission in one or more of the reserved resources 330, and the UE 115 may perform channel sensing in overlapping sidelink control resources (not pictured), which may result in interference.

As described herein, to improve a channel sensing procedure while operating in a full-duplex mode, the UE 115 may receive a configuration indicating two channel metrics for performing channel sensing. In some examples, a first channel metric may correspond to RSRP and a second channel metric may correspond to SINR. The configuration may further indicate first and second threshold values corresponding to the first and second channel metrics, respectively. If the UE 115 actively transmits while performing channel sensing, any interference experienced by the UE 115 may increase an RSRP measurement and decrease a SINR measurement. Accordingly, the UE 115 may more accurately identify an available set of resource candidates while performing full-duplex operations by measuring the resources according to the first channel metric and the second channel metric than according to a single channel metric.

The UE 115 may determine whether to measure the reference signaling according to the first channel metric, the second channel metric, or both, based on a duplex mode of the UE 115 during the sensing window 305. The UE 115 may operate in a full-duplex mode if the UE 115 performs a transmission in the sensing window 305 and a half-duplex mode if the UE 115 does not perform a transmission in the sensing window. In some examples, one or more resource elements 320, slots, or other sets of resources in the sensing window 305 may be allocated as full-duplex resources and one or more other resource elements 320, slots, or other sets of resources in the sensing window 305 may be allocated as half-duplex resources. A full-duplex slot may include a first subset of time and frequency resources allocated for transmission by the UE 115 and a second subset of time and frequency resources allocated for reception by the UE 115, and the first and second subsets of resources may be at least partially overlapping. A full-duplex resource may support in-band full-duplex resource allocation or a sub-band full-duplex resource allocation, as described with reference to FIG. 2.

If the UE 115 operates in the full-duplex mode, the UE 115 may measure reference signaling according to the first channel metric and the second channel metric to determine resource availability while accounting for the UE's own transmission. If the UE 115 operates in the half-duplex mode, the UE 115 may measure reference signaling according to the first channel metric to determine resource availability. In some examples, the UE 115 may be configured with a first threshold value corresponding to the first channel metric to use during full-duplex operations by the UE 115 and a second threshold value corresponding to the first channel metric to use during half-duplex operations by the UE 115. Additionally or alternatively, the UE 115 may use a single threshold value for measuring the reference signaling according to the first channel metric regardless of a duplex mode of the UE 115.

The duplex mode of the UE 115 may apply to each resource element 320 in the sensing window 305, or to one or more subsets of resource elements 320 in the sensing window 305. In one example, the resources in slots 3 through 5 of the sensing window 305 may be allocated for full-duplex communication by the UE 115, and the remaining resources in the sensing window 305 may be allocated for half-duplex communication by the UE 115, may not be allocated for communication by the UE 115, or both. The UE 115 may measure reference signaling received in slots 3 through 5 of the sensing window 305 according to the first and second channel metrics, and the UE 115 may measure reference signaling received in the remaining resources according to the first channel metric. Additionally or alternatively, the UE 115 may measure all of the resources in the sensing window 305 according to both channel metrics due to the UE 115 performing at least one transmission during at least one resource element 320 in the sensing window 305. In another example, each of the resource elements 320 in the sensing window 305 may be full-duplex resource elements 320, or each of the resource elements 320 in the sensing window 305 may be half-duplex resource elements 320.

In the example of FIG. 3, one or more time and/or frequency resources in slot 4 and subchannels 2 and 3 of the sensing window 305 may be allocated for a transmission by the UE 115. The time and frequency resources may at least partially overlap with the sidelink control resources 325 allocated for a scheduled SCI transmission by another UE 115 in slot 4 and subchannels 2 and 3. Accordingly, the resources may be full-duplex resources, and the UE 115 may operate in a full-duplex mode. The UE 115 may measure the reference signaling corresponding to the SCI according to the first channel metric to obtain a first measurement. If the first measurement is less than the first threshold value, the UE 115 may include the corresponding resource candidates in slot 4 and subchannels 2 and 3 of the resource selection window 310 in an available set of sidelink resource candidates. If the first measurement is greater than or equal to the first threshold, the UE 115 may measure the reference signaling according to the second channel metric to obtain a second measurement. If the second measurement is greater than the second threshold, the UE 115 may include the corresponding resource candidates in slot 4 and subchannels 2 and 3 of the resource selection window 310 in an available set of sidelink resource candidates. If the second measurement is less than or equal to the second threshold, the UE 115 may exclude the corresponding resource candidates from the available set. Accordingly, the UE 115 may use a first measurement, a first threshold value, a second measurement, a second threshold value, or any combination thereof to perform channel sensing while operating in a full-duplex mode, which may account for any interference that may be experienced by the UE's own transmission during the full-duplex mode.

The UE 115 may perform the described channel sensing procedure for each SCI received via the sidelink control resources 325 in the sensing window 305. That is, the UE 115 may determine whether the UE 115 will operate in a full-duplex or half-duplex mode, the UE 115 may measure the SCI according to the first channel metric, the second channel metric, or both, based on the duplex mode, and the UE 115 may include or exclude the corresponding resources (e.g., reserved resources 330) in the resource selection window 310 from an available set of resource candidates based on the measurements and respective threshold values.

The UE 115 may be configured with a second threshold value threshold quantity of available resource candidates, and the UE 115 may repeat the channel sensing procedure until a quantity of resources in the available set of resource candidates is greater than the threshold quantity. The threshold quantity may be, for example, a percentage of the quantity of resource candidates in the resource selection window 310 (e.g., X percent of the resource elements 320 in the resource selection window 310). If the available set of resource candidates is less than the threshold quantity, the UE 115 may adjust the first or second threshold values and repeat the channel sensing procedure to determine a second available set of resource candidates from the resource selection window 310 until a quantity of available resources is greater than the threshold. The UE 115 may be configured (e.g., via a RRC configuration) with one or more increments for adjusting the first and second threshold values. The UE 115 may increase the first threshold value (e.g., RSRP) by a configured increment, decrease the second threshold value (e.g., SINR) by a configured increment, or both, for each channel sensing procedure until the threshold quantity of available resources is exceeded.

In some examples, the UE 115 may be configured with an interference cancellation configuration for performing the channel sensing procedure in accordance with an interference cancellation procedure. The UE 115 may or may not perform interference cancellation while operating in a full-duplex mode. In some examples, the UE 115 may estimate an expected interference (e.g., self-interference) that may be received at the UE 115 during the sensing window 305 due to full-duplex communications by the UE 115. The UE 115 may perform interference cancellation if the expected interference is relatively high (e.g., above a threshold), and the UE 115 may not perform interference cancellation if the expected interference is relatively low (e.g., below a threshold). Additionally or alternatively, the UE 115 may determine whether to perform interference cancellation based on a power state of the UE 115, control signaling received by the UE 115, or some other parameters.

In one example, the interference cancellation configuration may configure the UE 115 with third and fourth threshold values corresponding to the first and second channel metrics, respectively, and associated with an interference cancellation procedure performed by the UE 115. That is, if the UE 115 performs interference cancellation, the UE 115 may determine resource availability by comparing a first measurement according to the first channel metric with the third threshold value and comparing a second measurement according to the second channel metric with the fourth threshold value. If the UE 115 does not perform interference cancellation, the UE 115 may determine resource availability according to the first and second threshold values, as previously discussed. In some examples, the third threshold value may be less than the first threshold value corresponding to the first channel metric (e.g., RSRP) and the fourth threshold value may be greater than the second threshold value corresponding to the second channel metric (e.g., SINR).

In another example, the interference cancellation configuration may instruct the UE 115 to drop channel sensing if the UE 115 does not apply interference cancellation in a full-duplex resource. That is, if interference cancellation is disabled at the UE 115, the UE 115 may refrain from performing channel sensing in the sensing window 305. In such cases, the UE 115 may not identify an available set of resource candidates, and the UE 115 may not select resources in the resource selection window 310 for performing a sidelink transmission.

Accordingly, a UE 115 as described herein may support techniques for channel sensing using two or more channel metrics while operating in a full-duplex mode to account for a transmission by the UE 115 while performing channel sensing. The UE 115 may thereby actively transmit data while performing a channel sensing procedure and utilize the two channel metrics to accurately identify an available set of sidelink resource candidates.

Figure 4:
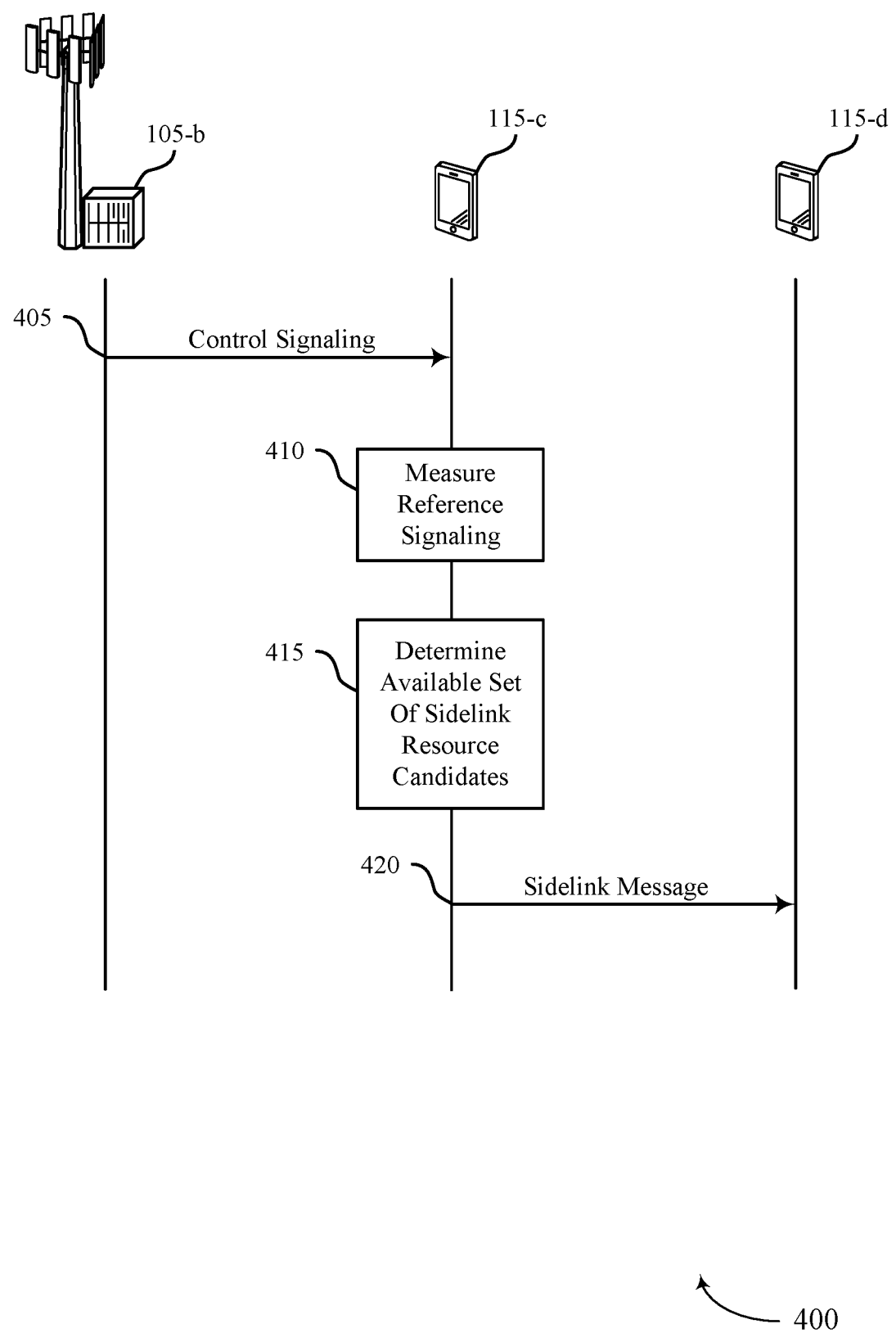
FIG. 4 illustrates an example of a process flow that supports channel sensing for full-duplex sidelink communications in accordance with aspects of the present disclosure.

FIG. 4 illustrates an example of a process flow 400 that supports channel sensing for full-duplex sidelink communications in accordance with aspects of the present disclosure. The process flow 400 may implement various aspects of the present disclosure described with reference to FIGS. 1-3. The process flow 400 may include a base station 105-*b*, a UE 115-*c*, and a UE 115-*d*, which may be examples of a base station 105 and UEs 115 as described with reference to FIGS. 1-3. In some examples, the UE 115-*c* may be configured with a first channel metric and a second channel metric for performing a channel sensing procedure of a sidelink resource selection procedure.

In the following description of the process flow 400, the operations between the UEs 115-*c*, 115-*d*, and the base station 105-*b* may be performed in different orders or at different times. Certain operations may also be left out of the process flow 400, or other operations may be added. Although the base station 105-*b*, the UE 115-*c*, and the UE 115-*d* are shown performing the operations of the process flow 400, some aspects of some operations may also be performed by one or more other wireless devices.

At 405, the UE 115-*c* may receive control signaling from the base station 105-*b*. The control signaling may indicate a configuration for performing a channel sensing procedure of a sidelink resource selection procedure for identifying sidelink resource candidates in a resource selection window. In some examples, the configuration may indicate a first channel metric for the channel sensing procedure and a second channel metric for the channel sensing procedure that is different than the first channel metric.

At 410, the UE 115-*c* may measure reference signaling in a sensing window according to the first channel metric, the second channel metric, or both, based on a duplex mode of the UE 115-*c* while measuring the reference signaling in the sensing window. The reference signaling in the sensing window may correspond to a set of sidelink resource candidates in the resource selection window, as described with reference to FIGS. 2 and 3. In some examples, the duplex mode may be a full-duplex mode or a half-duplex mode of the UE 115-*c* while measuring the reference signaling in the sensing window.

At 415, the UE 115-*c* may determine an available set of sidelink resource candidates from the set of sidelink resource candidates in the resource selection window. The UE 115-*c* may determine the available set of sidelink resource candidates based on measuring the reference signaling.

At 420, the UE 115-*c* may transmit a sidelink message to the UE 115-*d* using one or more resources of the available set of sidelink resources. In some examples, the UE 115-*c* may randomly select the one or more resources from the available set of sidelink resources.

Figure 5:
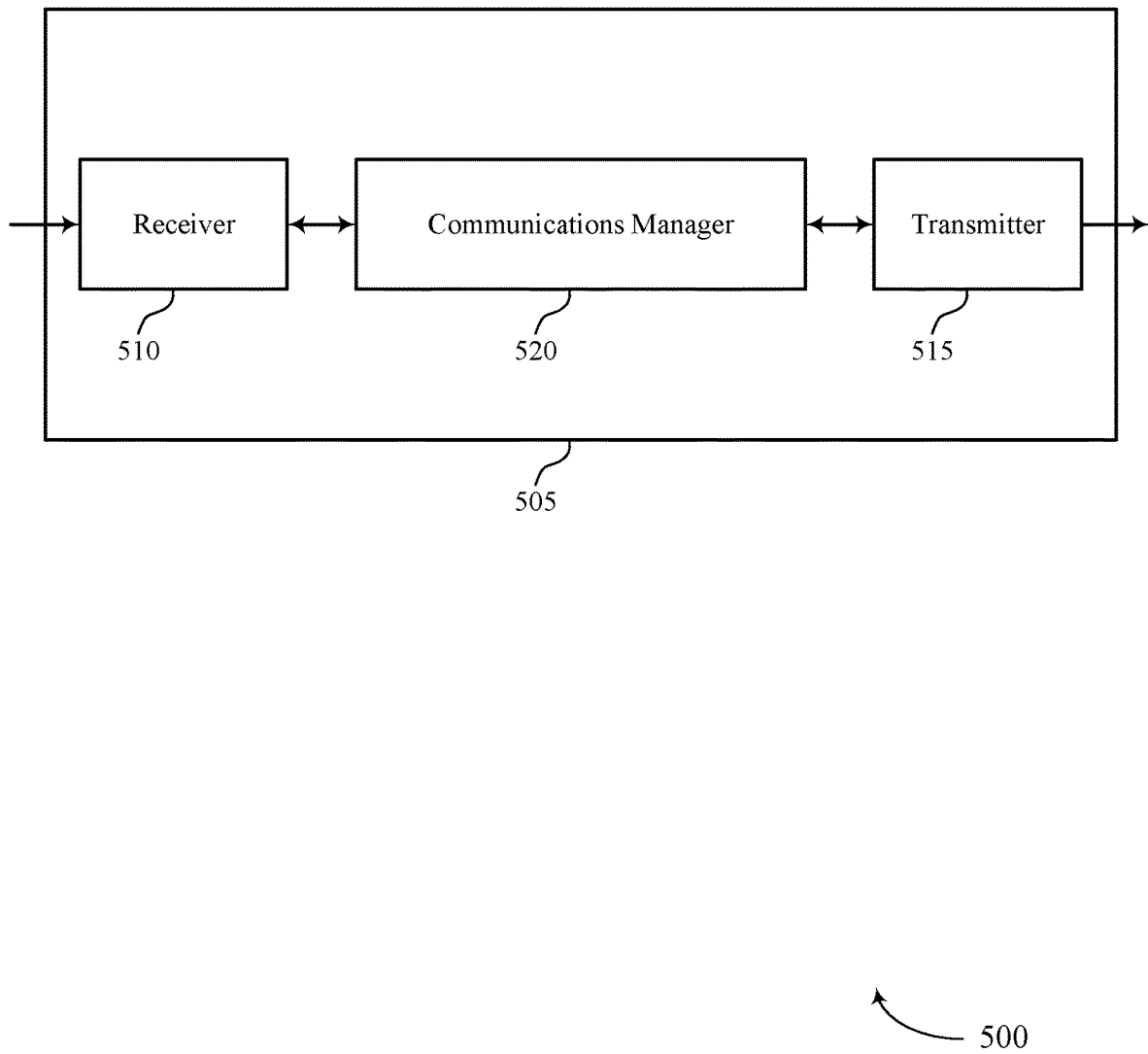
FIGS. 5 and 6 show block diagrams of devices that support channel sensing for full-duplex sidelink communications in accordance with aspects of the present disclosure.

FIG. 5 shows a block diagram 500 of a device 505 that supports channel sensing for full-duplex sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to channel sensing for full-duplex sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to channel sensing for full-duplex sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of channel sensing for full-duplex sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric. The communications manager 520 may be configured as or otherwise support a means for measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window. The communications manager 520 may be configured as or otherwise support a means for determining an available set of sidelink resource candidates from the set of sidelink resource candidates based on the measuring. The communications manager 520 may be configured as or otherwise support a means for transmitting a sidelink message using one or more resources of the available set of sidelink resource candidates.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources. By performing full-duplex communications during a channel sensing procedure, the processor of the device 505 (e.g., a UE 115) may perform more communications using fewer communication resources than if the processor refrains from transmitting while performing channel sensing (e.g., half-duplex communications). The processor may accurately perform the channel sensing procedure while operating in the full-duplex mode by utilizing two or more channel metrics for the channel sensing procedure. Accordingly, the processor of the device 505 may select resources that are available based on one or more channel metrics that account for potential interference at the device 505, which may provide for more efficient utilization of communication resources and reduced processing.

Figure 6:
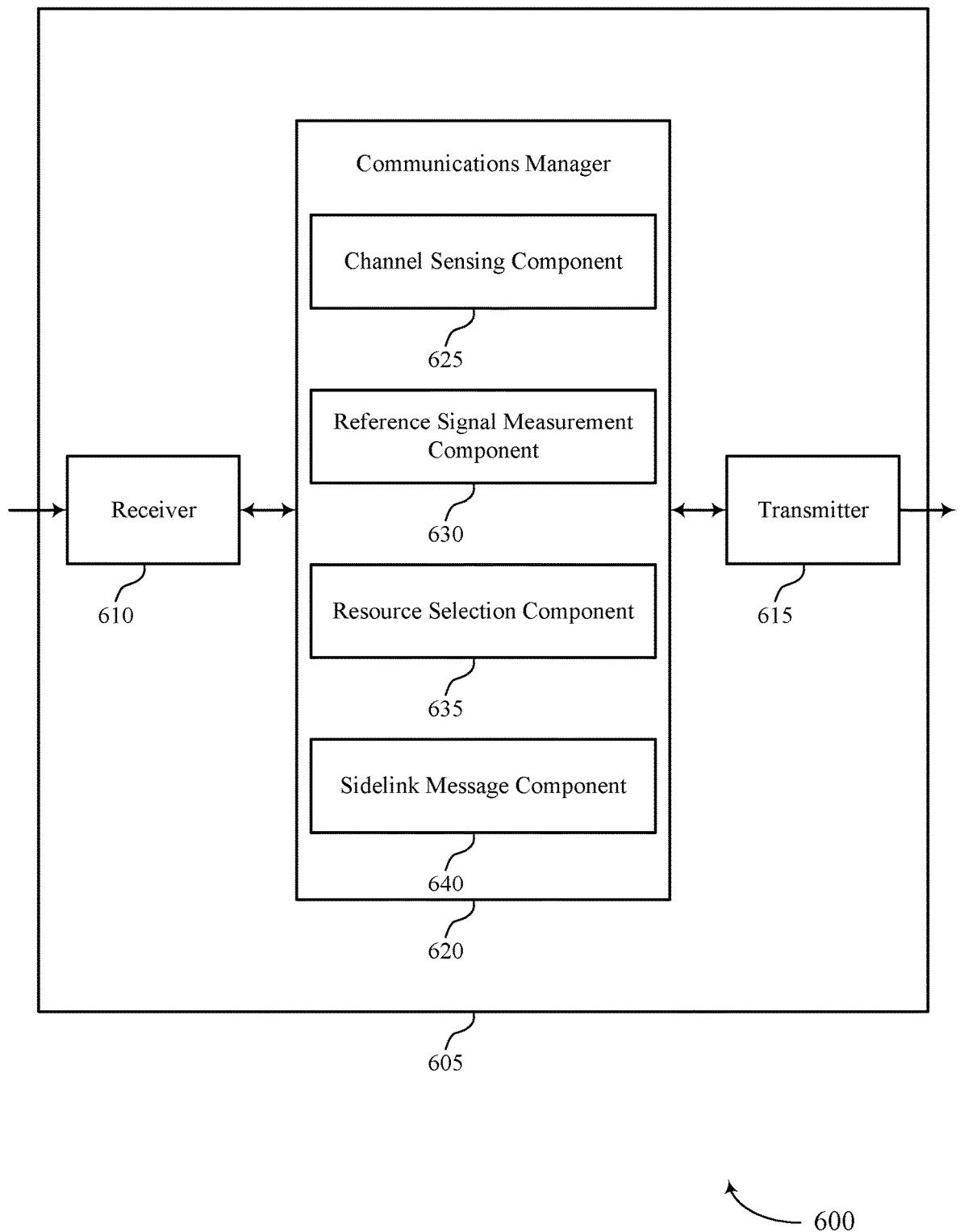

FIG. 6 shows a block diagram 600 of a device 605 that supports channel sensing for full-duplex sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel sensing for full-duplex sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel sensing for full-duplex sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of channel sensing for full-duplex sidelink communications as described herein. For example, the communications manager 620 may include a channel sensing component 625, a reference signal measurement component 630, a resource selection component 635, a sidelink message component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The channel sensing component 625 may be configured as or otherwise support a means for receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric. The reference signal measurement component 630 may be configured as or otherwise support a means for measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window. The resource selection component 635 may be configured as or otherwise support a means for determining an available set of sidelink resource candidates from the set of sidelink resource candidates based on the measuring. The sidelink message component 640 may be configured as or otherwise support a means for transmitting a sidelink message using one or more resources of the available set of sidelink resource candidates.

Figure 7:
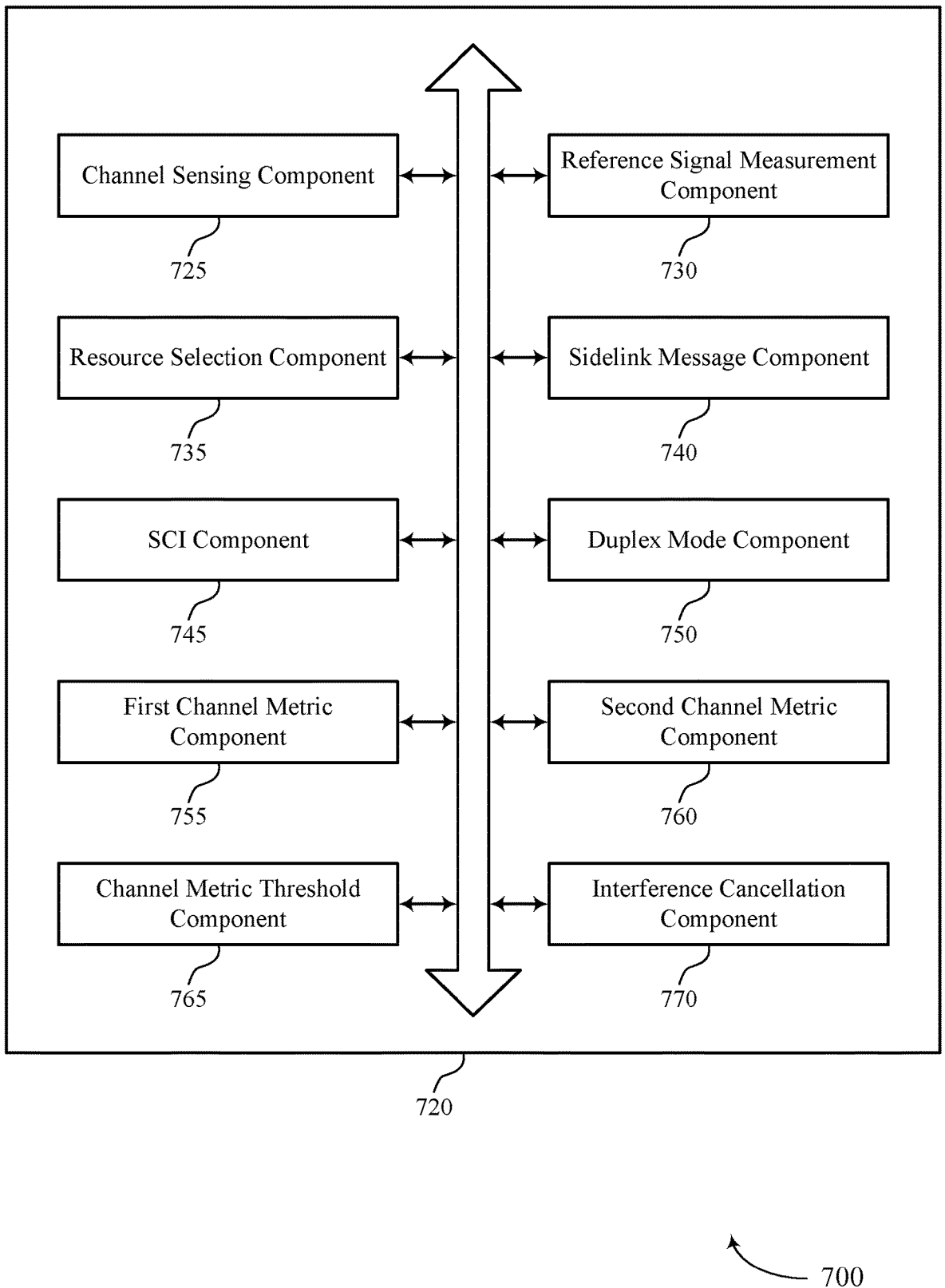
FIG. 7 shows a block diagram of a communications manager that supports channel sensing for full-duplex sidelink communications in accordance with aspects of the present disclosure.

FIG. 7 shows a block diagram 700 of a communications manager 720 that supports channel sensing for full-duplex sidelink communications in accordance with aspects of the present disclosure. The communications manager 720 may be an example of aspects of a communications manager 520, a communications manager 620, or both, as described herein. The communications manager 720, or various components thereof, may be an example of means for performing various aspects of channel sensing for full-duplex sidelink communications as described herein. For example, the communications manager 720 may include a channel sensing component 725, a reference signal measurement component 730, a resource selection component 735, a sidelink message component 740, an SCI component 745, a duplex mode component 750, a first channel metric component 755, a second channel metric component 760, a channel metric threshold component 765, an interference cancellation component 770, or any combination thereof. Each of these components may communicate, directly or indirectly, with one another (e.g., via one or more buses).

The communications manager 720 may support wireless communications at a UE in accordance with examples as disclosed herein. The channel sensing component 725 may be configured as or otherwise support a means for receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric. The reference signal measurement component 730 may be configured as or otherwise support a means for measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window. The resource selection component 735 may be configured as or otherwise support a means for determining an available set of sidelink resource candidates from the set of sidelink resource candidates based on the measuring. The sidelink message component 740 may be configured as or otherwise support a means for transmitting a sidelink message using one or more resources of the available set of sidelink resource candidates.

In some examples, the configuration further indicates a first threshold value corresponding to the first channel metric and a second threshold value corresponding to the second channel metric.

In some examples, to support determining the available set of sidelink resource candidates, the duplex mode component 750 may be configured as or otherwise support a means for determining that the duplex mode of the UE includes a full-duplex mode while measuring the reference signaling in the sensing window. In some examples, to support determining the available set of sidelink resource candidates, the first channel metric component 755 may be configured as or otherwise support a means for measuring the reference signaling according to the first channel metric to obtain a first measurement based on the full-duplex mode of the UE, where the first measurement is below the first threshold value. In some examples, to support determining the available set of sidelink resource candidates, the resource selection component 735 may be configured as or otherwise support a means for determining the available set of sidelink resource candidates based on the first channel metric and the first measurement being below the first threshold value.

In some examples, to support determining the available set of sidelink resource candidates, the duplex mode component 750 may be configured as or otherwise support a means for determining that the duplex mode of the UE includes a full-duplex mode while measuring the reference signaling in the sensing window. In some examples, to support determining the available set of sidelink resource candidates, the first channel metric component 755 may be configured as or otherwise support a means for measuring the reference signaling according to the first channel metric to obtain a first measurement based on the full-duplex mode of the UE, where the first measurement exceeds the first threshold value. In some examples, to support determining the available set of sidelink resource candidates, the second channel metric component 760 may be configured as or otherwise support a means for measuring the reference signaling according to the second channel metric to obtain a second measurement based on the first measurement exceeding the first threshold value. In some examples, to support determining the available set of sidelink resource candidates, the resource selection component 735 may be configured as or otherwise support a means for determining the available set of sidelink resource candidates based on the first channel metric and the second channel metric.

In some examples, to support determining the available set of sidelink resource candidates, the resource selection component 735 may be configured as or otherwise support a means for determining a quantity of sidelink resource candidates in the available set of sidelink resource candidates is less than the threshold quantity. In some examples, to support determining the available set of sidelink resource candidates, the channel metric threshold component 765 may be configured as or otherwise support a means for adjusting the first threshold value, the second threshold value, or both, based on determining the quantity of sidelink resource candidates is less than the threshold quantity. In some examples, to support determining the available set of sidelink resource candidates, the resource selection component 735 may be configured as or otherwise support a means for determining a second available set of sidelink resource candidates from the set of sidelink resource candidates based on the adjusted first threshold value, the adjusted second threshold value, or both, where the second available set of sidelink resource candidates includes at least the available set of sidelink resource candidates.

In some examples, the configuration further indicates a first threshold value for the first channel metric corresponding to a first duplex mode of the UE and a second threshold value for the first channel metric corresponding to a second duplex mode of the UE. In some examples, the first duplex mode of the UE includes a full-duplex mode while measuring the reference signaling in the sensing window. In some examples, the second duplex mode of the UE includes a half-duplex mode while measuring the reference signaling in the sensing window.

In some examples, the configuration further indicates an interference cancellation configuration for performing the channel sensing procedure. In some examples, the configuration further indicates a first threshold value corresponding to the first channel metric and a second threshold value corresponding to the second channel metric. In some examples, the interference cancellation configuration indicates a third threshold value corresponding to the first channel metric and a fourth threshold value corresponding to the second channel metric, the third threshold value and the fourth threshold value associated with an interference cancellation procedure performed by the UE in the sensing window.

In some examples, to support determining the available set of sidelink resource candidates, the interference cancellation component 770 may be configured as or otherwise support a means for performing interference cancellation in the sensing window in accordance with a first duplex mode, where the first duplex mode includes a full-duplex mode while measuring the reference signaling in the sensing window. In some examples, to support determining the available set of sidelink resource candidates, the resource selection component 735 may be configured as or otherwise support a means for determining the available set of sidelink resource candidates in accordance with the interference cancellation configuration and performing an interference cancellation procedure.

In some examples, the interference cancellation configuration indicates refraining from performing the channel sensing procedure when the duplex mode of the UE includes a full-duplex mode while measuring the reference signaling in the sensing window and when interference cancellation at the UE is disabled.

In some examples, the first channel metric corresponds to a RSRP and the second channel metric corresponds to a SINR.

In some examples, to support measuring the reference signaling, the SCI component 745 may be configured as or otherwise support a means for receiving, in the sensing window, SCI corresponding to the reference signaling. In some examples, to support measuring the reference signaling, the SCI component 745 may be configured as or otherwise support a means for measuring the SCI corresponding to the reference signaling in accordance with the first channel metric, the second channel metric, or both.

Figure 8:
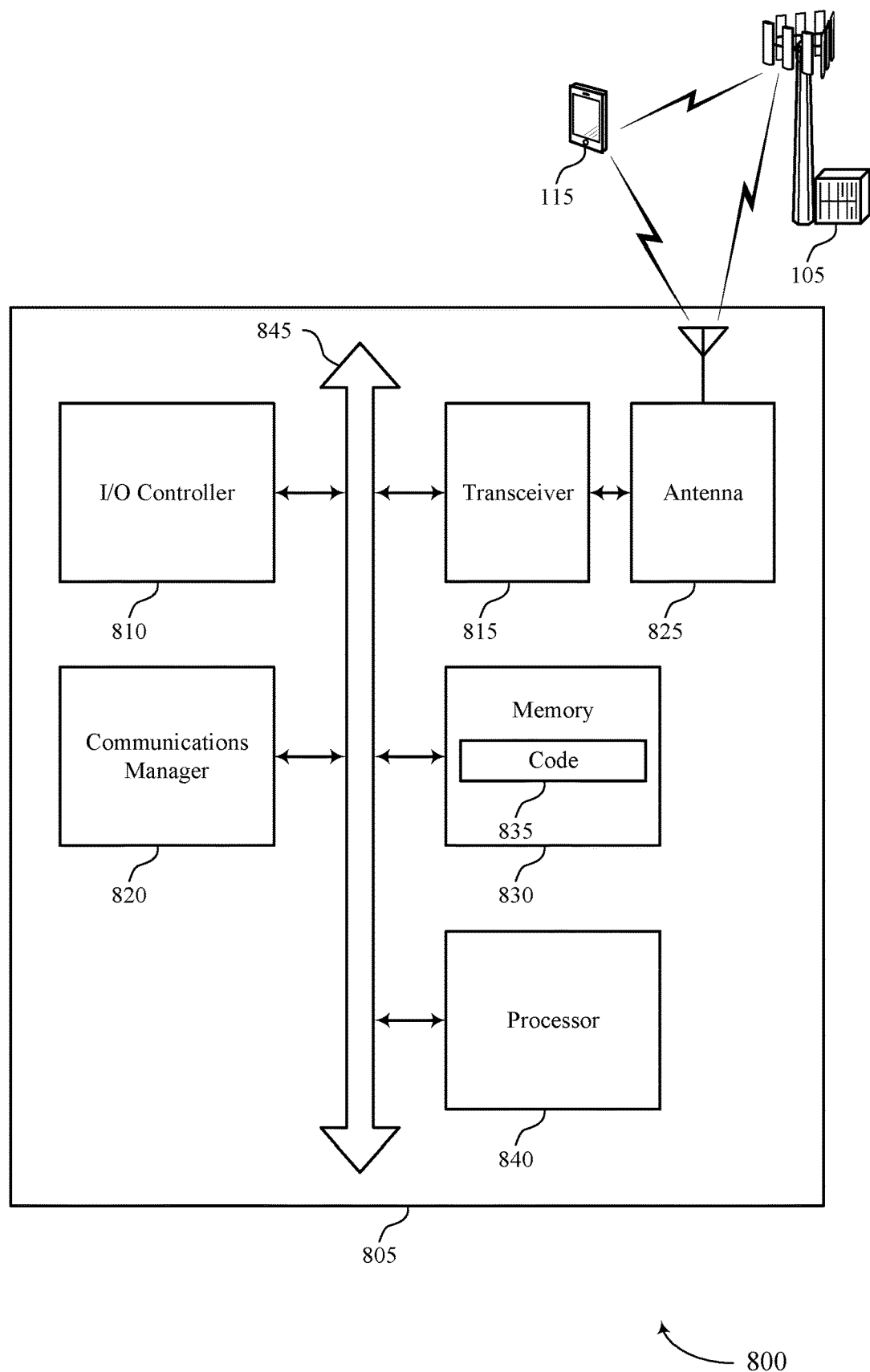
FIG. 8 shows a diagram of a system including a device that supports channel sensing for full-duplex sidelink communications in accordance with aspects of the present disclosure.

FIG. 8 shows a diagram of a system 800 including a device 805 that supports channel sensing for full-duplex sidelink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting channel sensing for full-duplex sidelink communications). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric. The communications manager 820 may be configured as or otherwise support a means for measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window. The communications manager 820 may be configured as or otherwise support a means for determining an available set of sidelink resource candidates from the set of sidelink resource candidates based on the measuring. The communications manager 820 may be configured as or otherwise support a means for transmitting a sidelink message using one or more resources of the available set of sidelink resource candidates.

By including or configuring the communications manager 820 in accordance with examples as described herein, the device 805 may support techniques for improved communication reliability, reduced latency, and more efficient utilization of communication resources. By performing full-duplex communications during a channel sensing procedure, the device 805 (e.g., a UE 115) may perform more communications using fewer communication resources than if the device 805 refrains from transmitting while performing a channel sensing procedure (e.g., half-duplex communications), which may provide for more efficient utilization of communication resources. The device 805 may accurately perform the channel sensing procedure while operating in the full-duplex mode by utilizing two or more channel metrics for the channel sensing procedure, which may account for interference experienced as a result of a transmission by the device 505. Accordingly, by performing channel sensing and sidelink resource selection based on two or more channel metrics, the device 505 accurately select available resources, which may reduce interference, improve communication reliability, and reduce latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of channel sensing for full-duplex sidelink communications as described herein, or the processor 840 and the memory 830 may be otherwise configured to perform or support such operations.

Figure 9:
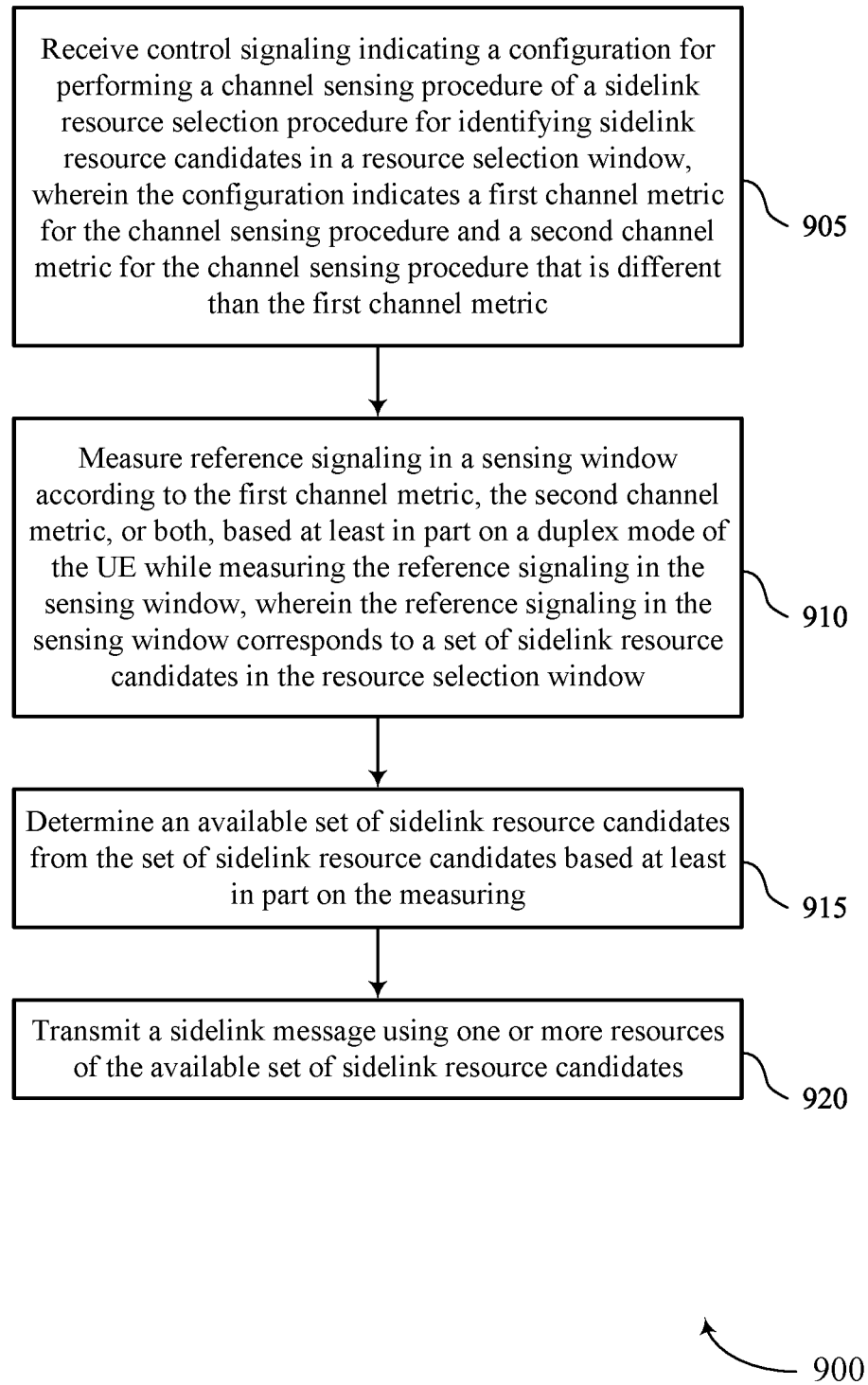
FIGS. 9 through 11 show flowcharts illustrating methods that support channel sensing for full-duplex sidelink communications in accordance with aspects of the present disclosure.

FIG. 9 shows a flowchart illustrating a method 900 that supports channel sensing for full-duplex sidelink communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric. The operations of 905 may be performed in accordance with examples as disclosed herein. In some examples, aspects of the operations of 905 may be performed by a channel sensing component 725 as described with reference to FIG. 7.

At 910, the method may include measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window. The operations of 910 may be performed in accordance with examples as disclosed herein. In some examples, aspects of the operations of 910 may be performed by a reference signal measurement component 730 as described with reference to FIG. 7.

At 915, the method may include determining an available set of sidelink resource candidates from the set of sidelink resource candidates based on the measuring. The operations of 915 may be performed in accordance with examples as disclosed herein. In some examples, aspects of the operations of 915 may be performed by a resource selection component 735 as described with reference to FIG. 7.

At 920, the method may include transmitting a sidelink message using one or more resources of the available set of sidelink resource candidates. The operations of 920 may be performed in accordance with examples as disclosed herein. In some examples, aspects of the operations of 920 may be performed by a sidelink message component 740 as described with reference to FIG. 7.

Figure 10:
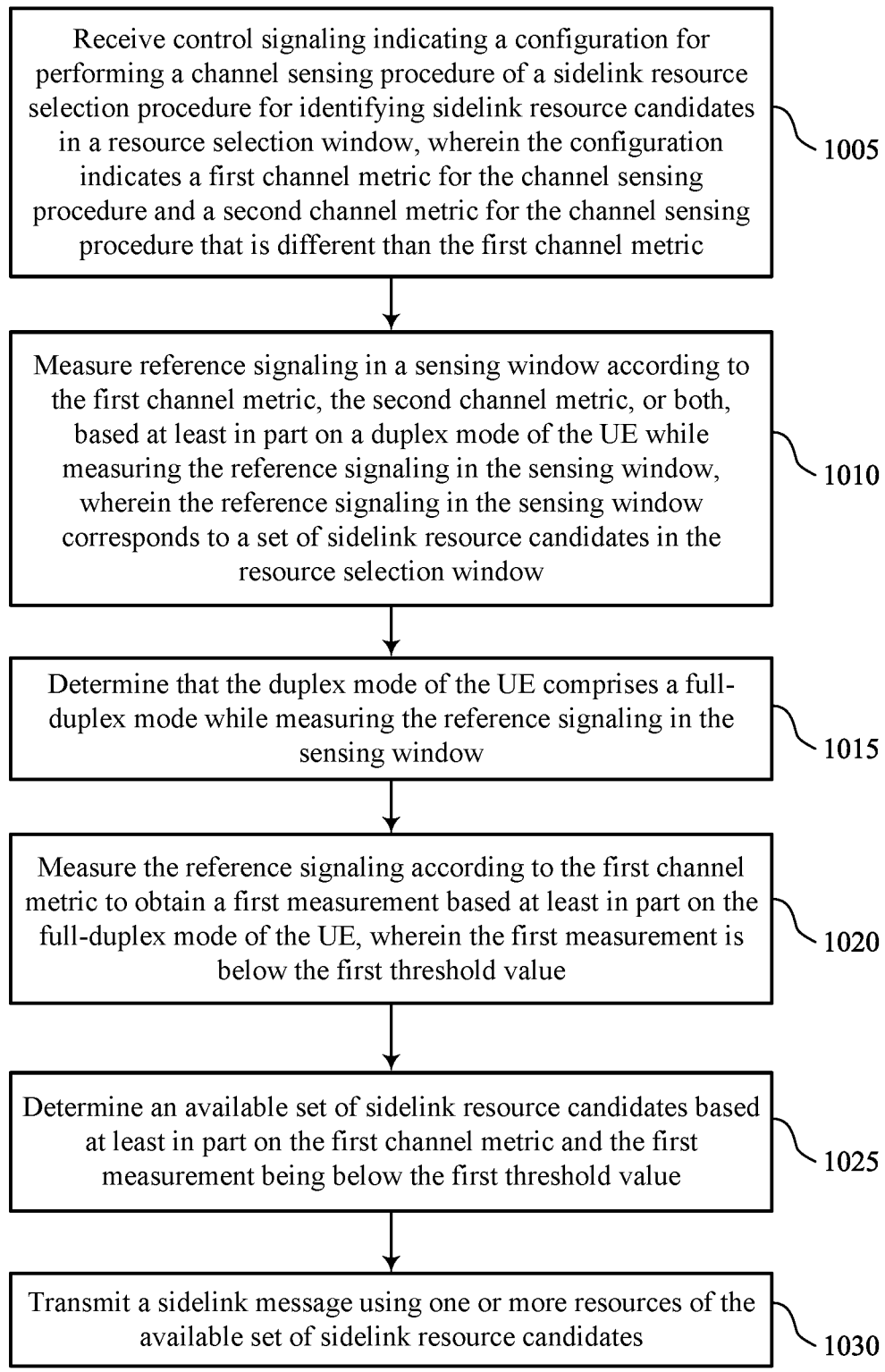

FIG. 10 shows a flowchart illustrating a method 1000 that supports channel sensing for full-duplex sidelink communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric. The operations of 1005 may be performed in accordance with examples as disclosed herein. In some examples, aspects of the operations of 1005 may be performed by a channel sensing component 725 as described with reference to FIG. 7.

At 1010, the method may include measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window. The operations of 1010 may be performed in accordance with examples as disclosed herein. In some examples, aspects of the operations of 1010 may be performed by a reference signal measurement component 730 as described with reference to FIG. 7.

At 1015, the method may include determining that the duplex mode of the UE includes a full-duplex mode while measuring the reference signaling in the sensing window. The operations of 1015 may be performed in accordance with examples as disclosed herein. In some examples, aspects of the operations of 1015 may be performed by a duplex mode component 750 as described with reference to FIG. 7.

At 1020, the method may include measuring the reference signaling according to the first channel metric to obtain a first measurement based on the full-duplex mode of the UE, where the first measurement is below the first threshold value. The operations of 1020 may be performed in accordance with examples as disclosed herein. In some examples, aspects of the operations of 1020 may be performed by a first channel metric component 755 as described with reference to FIG. 7.

At 1025, the method may include determining an available set of sidelink resource candidates from the set of sidelink resource candidates based on the first channel metric and the first measurement being below the first threshold value. The operations of 1025 may be performed in accordance with examples as disclosed herein. In some examples, aspects of the operations of 1025 may be performed by a resource selection component 735 as described with reference to FIG. 7.

At 1030, the method may include transmitting a sidelink message using one or more resources of the available set of sidelink resource candidates. The operations of 1030 may be performed in accordance with examples as disclosed herein. In some examples, aspects of the operations of 1030 may be performed by a sidelink message component 740 as described with reference to FIG. 7.

Figure 11:
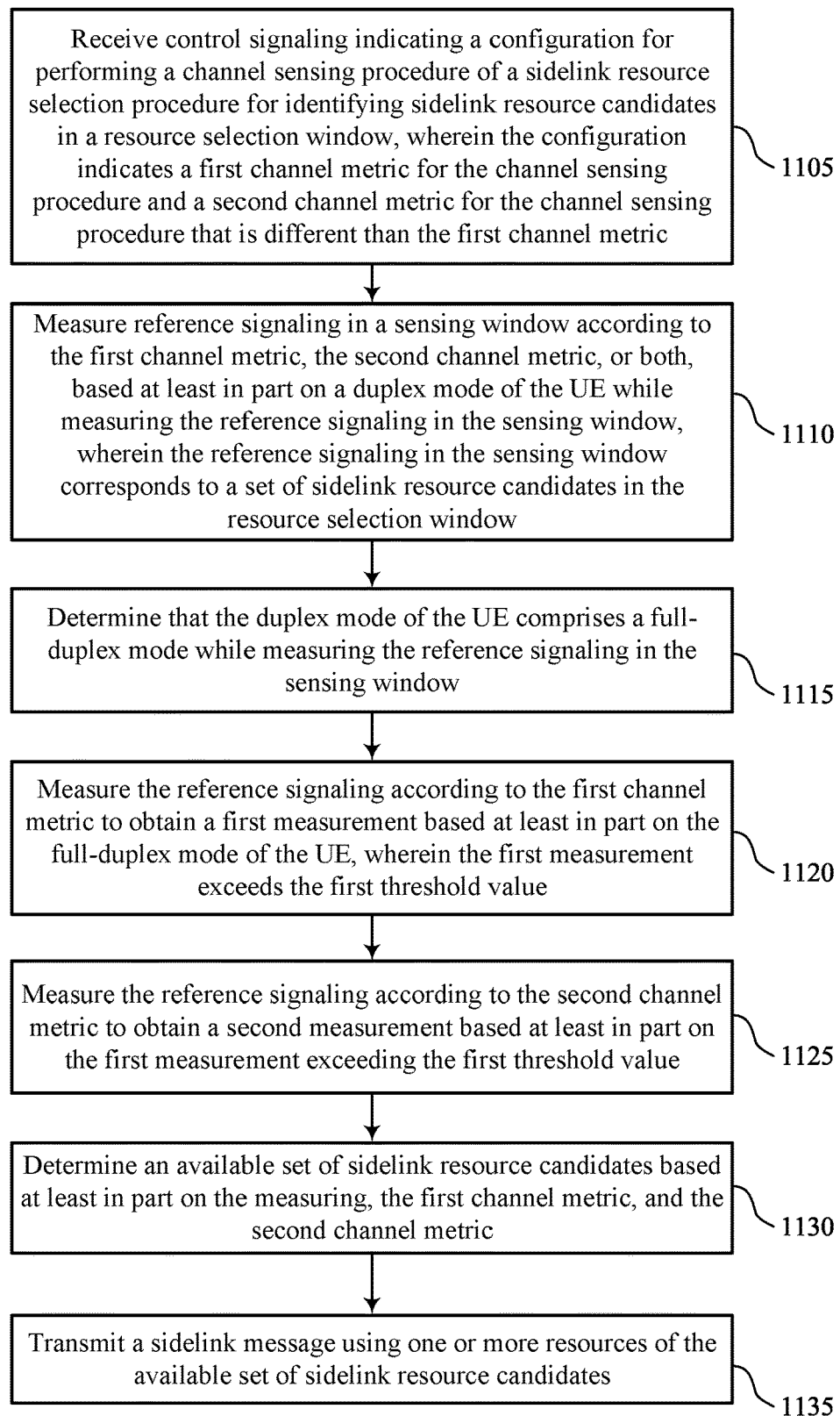

FIG. 11 shows a flowchart illustrating a method 1100 that supports channel sensing for full-duplex sidelink communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving control signaling indicating a configuration for performing a channel sensing procedure of a sidelink resource selection procedure for identifying sidelink resource candidates in a resource selection window, where the configuration indicates a first channel metric for the channel sensing procedure and a second channel metric for the channel sensing procedure that is different than the first channel metric. The operations of 1105 may be performed in accordance with examples as disclosed herein. In some examples, aspects of the operations of 1105 may be performed by a channel sensing component 725 as described with reference to FIG. 7.

At 1110, the method may include measuring reference signaling in a sensing window according to the first channel metric, the second channel metric, or both, based on a duplex mode of the UE while measuring the reference signaling in the sensing window, where the reference signaling in the sensing window corresponds to a set of sidelink resource candidates in the resource selection window. The operations of 1110 may be performed in accordance with examples as disclosed herein. In some examples, aspects of the operations of 1110 may be performed by a reference signal measurement component 730 as described with reference to FIG. 7.

At 1115, the method may include determining that the duplex mode of the UE includes a full-duplex mode while measuring the reference signaling in the sensing window.

The operations of 1115 may be performed in accordance with examples as disclosed herein. In some examples, aspects of the operations of 1115 may be performed by a duplex mode component 750 as described with reference to FIG. 7.

At 1120, the method may include measuring the reference signaling according to the first channel metric to obtain a first measurement based on the full-duplex mode of the UE, where the first measurement exceeds the first threshold value. The operations of 1120 may be performed in accordance with examples as disclosed herein. In some examples, aspects of the operations of 1120 may be performed by a first channel metric component 755 as described with reference to FIG. 7.

At 1125, the method may include measuring the reference signaling according to the second channel metric to obtain a second measurement based on the first measurement exceeding the first threshold value. The operations of 1125 may be performed in accordance with examples as disclosed herein. In some examples, aspects of the operations of 1125 may be performed by a second channel metric component 760 as described with reference to FIG. 7.

At 1130, the method may include determining an available set of sidelink resource candidates based on the measuring, the first channel metric, and the second channel metric. The operations of 1130 may be performed in accordance with examples as disclosed herein. In some examples, aspects of the operations of 1130 may be performed by a resource selection component 735 as described with reference to FIG. 7.

At 1135, the method may include transmitting a sidelink message using one or more resources of the available set of sidelink resource candidates. The operations of 1135 may be performed in accordance with examples as disclosed herein. In some examples, aspects of the operations of 1135 may be performed by a sidelink message component 740 as described with reference to FIG. 7.

The following provides an overview of aspects of the present disclosure:

Aspect 1: A method for wireless communications at a UE, comprising: receiving control signaling indicating a configuration for performing a channel sensing procedure of a sidelink resource selection procedure for identifying sidelink resource candidates in a resource selection window, wherein the configuration indicates a first channel metric for the channel sensing procedure and a second channel metric for the channel sensing procedure that is different than the first channel metric; measuring reference signaling in a sensing window according to the first channel metric, the second channel metric, or both, based at least in part on a duplex mode of the UE while measuring the reference signaling in the sensing window, wherein the reference signaling in the sensing window corresponds to a set of sidelink resource candidates in the resource selection window; determining an available set of sidelink resource candidates from the set of sidelink resource candidates based at least in part on the measuring; and transmitting a sidelink message using one or more resources of the available set of sidelink resource candidates.

Aspect 2: The method of aspect 1, wherein the configuration further indicates a first threshold value corresponding to the first channel metric and a second threshold value corresponding to the second channel metric.

Aspect 3: The method of aspect 2, wherein determining the available set of sidelink resource candidates further comprises: determining that the duplex mode of the UE comprises a full-duplex mode while measuring the reference signaling in the sensing window; measuring the reference signaling according to the first channel metric to obtain a first measurement based at least in part on the full-duplex mode of the UE, wherein the first measurement is below the first threshold value; and determining the available set of sidelink resource candidates based at least in part on the first channel metric and the first measurement being below the first threshold value.

Aspect 4: The method of aspect 2, wherein determining the available set of sidelink resource candidates further comprises: determining that the duplex mode of the UE comprises a full-duplex mode while measuring the reference signaling in the sensing window; measuring the reference signaling according to the first channel metric to obtain a first measurement based at least in part on the full-duplex mode of the UE, wherein the first measurement exceeds the first threshold value; measuring the reference signaling according to the second channel metric to obtain a second measurement based at least in part on the first measurement exceeding the first threshold value; and determining the available set of sidelink resource candidates based at least in part on the first channel metric and the second channel metric.

Aspect 5: The method of any of aspects 2 through 4, wherein the configuration further indicates a threshold quantity of available sidelink resource candidates, and wherein determining the available set of sidelink resource candidates further comprises: determining a quantity of sidelink resource candidates in the available set of sidelink resource candidates is less than the threshold quantity; adjusting the first threshold value, the second threshold value, or both, based at least in part on determining the quantity of sidelink resource candidates is less than the threshold quantity; and determining a second available set of sidelink resource candidates from the set of sidelink resource candidates based at least in part on the adjusted first threshold value, the adjusted second threshold value, or both, wherein the second available set of sidelink resource candidates comprises at least the available set of sidelink resource candidates.

Aspect 6: The method of any of aspects 1 through 5, wherein the configuration further indicates a first threshold value for the first channel metric corresponding to a first duplex mode of the UE and a second threshold value for the first channel metric corresponding to a second duplex mode of the UE.

Aspect 7: The method of aspect 6, wherein: the first duplex mode of the UE comprises a full-duplex mode while measuring the reference signaling in the sensing window; and the second duplex mode of the UE comprises a half-duplex mode while measuring the reference signaling in the sensing window.

Aspect 8: The method of any of aspects 1 through 7, wherein the configuration further indicates an interference cancellation configuration for performing the channel sensing procedure.

Aspect 9: The method of aspect 8, wherein: the configuration further indicates a first threshold value corresponding to the first channel metric and a second threshold value corresponding to the second channel metric; and the interference cancellation configuration indicates a third threshold value corresponding to the first channel metric and a fourth threshold value corresponding to the second channel metric, the third threshold value and the fourth threshold value associated with an interference cancellation procedure performed by the UE in the sensing window.

Aspect 10: The method of any of aspects 8 through 9, wherein determining the available set of sidelink resource candidates comprises: performing interference cancellation in the sensing window in accordance with a first duplex mode, wherein the first duplex mode comprises a full-duplex mode while measuring the reference signaling in the sensing window; and determining the available set of sidelink resource candidates in accordance with the interference cancellation configuration and performing an interference cancellation procedure.

Aspect 11: The method of any of aspect 8, wherein the interference cancellation configuration indicates refraining from performing the channel sensing procedure when the duplex mode of the UE comprises a full-duplex mode while measuring the reference signaling in the sensing window and when interference cancellation at the UE is disabled.

Aspect 12: The method of any of aspects 1 through 11, wherein the first channel metric corresponds to a RSRP and the second channel metric corresponds to a SINR.

Aspect 13: The method of any of aspects 1 through 12, wherein measuring the reference signaling further comprises: receiving, in the sensing window, SCI corresponding to the reference signaling; and measuring the SCI corresponding to the reference signaling in accordance with the first channel metric, the second channel metric, or both.

Aspect 14: An apparatus for wireless communications at a UE, comprising a processor; memory coupled with the processor; and instructions stored in the memory and executable by the processor to cause the apparatus to perform a method of any of aspects 1 through 13.

Aspect 15: An apparatus for wireless communications at a UE, comprising at least one means for performing a method of any of aspects 1 through 13.

Aspect 16: A non-transitory computer-readable medium storing code for wireless communications at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving control signaling indicating a configuration for performing a channel sensing procedure of a sidelink resource selection procedure for identifying sidelink resource candidates in a resource selection window, wherein the configuration indicates a first channel metric for the channel sensing procedure and a second channel metric for the channel sensing procedure that is different than the first channel metric;
    measuring reference signaling in a sensing window according to the first channel metric, the second channel metric, or both, based at least in part on a duplex mode of the UE while measuring the reference signaling in the sensing window, wherein the reference signaling in the sensing window corresponds to a set of sidelink resource candidates in the resource selection window;
    determining an available set of sidelink resource candidates from the set of sidelink resource candidates based at least in part on the measuring; and
    transmitting a sidelink message using one or more resources of the available set of sidelink resource candidates.

2. The method of claim 1, wherein the configuration further indicates a first threshold value corresponding to the first channel metric and a second threshold value corresponding to the second channel metric.

3. The method of claim 2, wherein determining the available set of sidelink resource candidates further comprises:
    determining that the duplex mode of the UE comprises a full-duplex mode while measuring the reference signaling in the sensing window;
    measuring the reference signaling according to the first channel metric to obtain a first measurement based at least in part on the full-duplex mode of the UE, wherein the first measurement is below the first threshold value; and
    determining the available set of sidelink resource candidates based at least in part on the first channel metric and the first measurement being below the first threshold value.

4. The method of claim 2, wherein determining the available set of sidelink resource candidates further comprises:
    determining that the duplex mode of the UE comprises a full-duplex mode while measuring the reference signaling in the sensing window;
    measuring the reference signaling according to the first channel metric to obtain a first measurement based at least in part on the full-duplex mode of the UE, wherein the first measurement exceeds the first threshold value;
    measuring the reference signaling according to the second channel metric to obtain a second measurement based at least in part on the first measurement exceeding the first threshold value; and
    determining the available set of sidelink resource candidates based at least in part on the first channel metric and the second channel metric.

5. The method of claim 2, wherein the configuration further indicates a threshold quantity of available sidelink resource candidates, and wherein determining the available set of sidelink resource candidates further comprises:
    determining a quantity of sidelink resource candidates in the available set of sidelink resource candidates is less than the threshold quantity;
    adjusting the first threshold value, the second threshold value, or both, based at least in part on determining the quantity of sidelink resource candidates is less than the threshold quantity; and
    determining a second available set of sidelink resource candidates from the set of sidelink resource candidates based at least in part on the adjusted first threshold value, the adjusted second threshold value, or both, wherein the second available set of sidelink resource candidates comprises at least the available set of sidelink resource candidates.

6. The method of claim 1, wherein the configuration further indicates a first threshold value for the first channel metric corresponding to a first duplex mode of the UE and a second threshold value for the first channel metric corresponding to a second duplex mode of the UE.

7. The method of claim 6, wherein:
    the first duplex mode of the UE comprises a full-duplex mode while measuring the reference signaling in the sensing window; and
    the second duplex mode of the UE comprises a half-duplex mode while measuring the reference signaling in the sensing window.

8. The method of claim 1, wherein the configuration further indicates an interference cancellation configuration for performing the channel sensing procedure.

9. The method of claim 8, wherein:
the configuration further indicates a first threshold value corresponding to the first channel metric and a second threshold value corresponding to the second channel metric; and
the interference cancellation configuration indicates a third threshold value corresponding to the first channel metric and a fourth threshold value corresponding to the second channel metric, the third threshold value and the fourth threshold value associated with an interference cancellation procedure performed by the UE in the sensing window.

10. The method of claim 8, wherein determining the available set of sidelink resource candidates comprises:
performing interference cancellation in the sensing window in accordance with a first duplex mode, wherein the first duplex mode comprises a full-duplex mode while measuring the reference signaling in the sensing window; and
determining the available set of sidelink resource candidates in accordance with the interference cancellation configuration and performing an interference cancellation procedure.

11. The method of claim 8, wherein the interference cancellation configuration indicates refraining from performing the channel sensing procedure when the duplex mode of the UE comprises a full-duplex mode while measuring the reference signaling in the sensing window and when interference cancellation at the UE is disabled.

12. The method of claim 1, wherein the first channel metric corresponds to a reference signal received power and the second channel metric corresponds to a signal-to-interference-plus-noise ratio.

13. The method of claim 1, wherein measuring the reference signaling further comprises:
receiving, in the sensing window, sidelink control information corresponding to the reference signaling; and
measuring the sidelink control information corresponding to the reference signaling in accordance with the first channel metric, the second channel metric, or both.

14. An apparatus for wireless communications at a user equipment (UE), comprising:
a processor;
memory coupled with the processor; and
instructions stored in the memory and executable by the processor to cause the apparatus to:
receive control signaling indicating a configuration for performing a channel sensing procedure of a sidelink resource selection procedure for identifying sidelink resource candidates in a resource selection window, wherein the configuration indicates a first channel metric for the channel sensing procedure and a second channel metric for the channel sensing procedure that is different than the first channel metric;
measure reference signaling in a sensing window according to the first channel metric, the second channel metric, or both, based at least in part on a duplex mode of the UE while measuring the reference signaling in the sensing window, wherein the reference signaling in the sensing window corresponds to a set of sidelink resource candidates in the resource selection window;
determine an available set of sidelink resource candidates from the set of sidelink resource candidates based at least in part on the measuring; and
transmit a sidelink message using one or more resources of the available set of sidelink resource candidates.

15. The apparatus of claim 14, wherein the configuration further indicates a first threshold value corresponding to the first channel metric and a second threshold value corresponding to the second channel metric.

16. The apparatus of claim 15, wherein the instructions to determine the available set of sidelink resource candidates are further executable by the processor to cause the apparatus to:
determine that the duplex mode of the UE comprises a full-duplex mode while measuring the reference signaling in the sensing window;
measure the reference signaling according to the first channel metric to obtain a first measurement based at least in part on the full-duplex mode of the UE, wherein the first measurement is below the first threshold value; and
determine the available set of sidelink resource candidates based at least in part on the first channel metric and the first measurement being below the first threshold value.

17. The apparatus of claim 15, wherein the instructions to determine the available set of sidelink resource candidates are further executable by the processor to cause the apparatus to:
determine that the duplex mode of the UE comprises a full-duplex mode while measuring the reference signaling in the sensing window;
measure the reference signaling according to the first channel metric to obtain a first measurement based at least in part on the full-duplex mode of the UE, wherein the first measurement exceeds the first threshold value;
measure the reference signaling according to the second channel metric to obtain a second measurement based at least in part on the first measurement exceeding the first threshold value; and
determine the available set of sidelink resource candidates based at least in part on the first channel metric and the second channel metric.

18. The apparatus of claim 15, wherein the configuration further indicates a threshold quantity of available sidelink resource candidates, and wherein the instructions to determine the available set of sidelink resource candidates are further executable by the processor to cause the apparatus to:
determine a quantity of sidelink resource candidates in the available set of sidelink resource candidates is less than the threshold quantity;
adjust the first threshold value, the second threshold value, or both, based at least in part on determining the quantity of sidelink resource candidates is less than the threshold quantity; and
determine a second available set of sidelink resource candidates from the set of sidelink resource candidates based at least in part on the adjusted first threshold value, the adjusted second threshold value, or both, wherein the second available set of sidelink resource candidates comprises at least the available set of sidelink resource candidates.

19. The apparatus of claim 14, wherein the configuration further indicates a first threshold value for the first channel metric corresponding to a first duplex mode of the UE and a second threshold value for the first channel metric corresponding to a second duplex mode of the UE.

20. The apparatus of claim 19, wherein:
the first duplex mode of the UE comprises a full-duplex mode while measuring the reference signaling in the sensing window; and
the second duplex mode of the UE comprises a half-duplex mode while measuring the reference signaling in the sensing window.

21. The apparatus of claim 14, wherein the configuration further indicates an interference cancellation configuration for performing the channel sensing procedure.

22. The apparatus of claim 21, wherein:
the configuration further indicates a first threshold value corresponding to the first channel metric and a second threshold value corresponding to the second channel metric; and
the interference cancellation configuration indicates a third threshold value corresponding to the first channel metric and a fourth threshold value corresponding to the second channel metric, the third threshold value and the fourth threshold value associated with an interference cancellation procedure performed by the UE in the sensing window.

23. The apparatus of claim 21, wherein the instructions to determine the available set of sidelink resource candidates are executable by the processor to cause the apparatus to:
perform interference cancellation in the sensing window in accordance with a first duplex mode, wherein the first duplex mode comprises a full-duplex mode while measuring the reference signaling in the sensing window; and
determine the available set of sidelink resource candidates in accordance with the interference cancellation configuration and performing an interference cancellation procedure.

24. The apparatus of claim 21, wherein the interference cancellation configuration indicates refraining from performing the channel sensing procedure when the duplex mode of the UE comprises a full-duplex mode while measuring the reference signaling in the sensing window and when interference cancellation at the UE is disabled.

25. The apparatus of claim 14, wherein the first channel metric corresponds to a reference signal received power and the second channel metric corresponds to a signal-to-interference-plus-noise ratio.

26. The apparatus of claim 14, wherein the instructions to measure the reference signaling are further executable by the processor to cause the apparatus to:
receive, in the sensing window, sidelink control information corresponding to the reference signaling; and
measure the sidelink control information corresponding to the reference signaling in accordance with the first channel metric, the second channel metric, or both.

27. An apparatus for wireless communications at a user equipment (UE), comprising:
means for receiving control signaling indicating a configuration for performing a channel sensing procedure of a sidelink resource selection procedure for identifying sidelink resource candidates in a resource selection window, wherein the configuration indicates a first channel metric for the channel sensing procedure and a second channel metric for the channel sensing procedure that is different than the first channel metric;
means for measuring reference signaling in a sensing window according to the first channel metric, the second channel metric, or both, based at least in part on a duplex mode of the UE while measuring the reference signaling in the sensing window, wherein the reference signaling in the sensing window corresponds to a set of sidelink resource candidates in the resource selection window;
means for determining an available set of sidelink resource candidates from the set of sidelink resource candidates based at least in part on the measuring; and
means for transmitting a sidelink message using one or more resources of the available set of sidelink resource candidates.

28. The apparatus of claim 27, wherein the configuration further indicates a first threshold value corresponding to the first channel metric and a second threshold value corresponding to the second channel metric.

29. The apparatus of claim 28, wherein the means for determining the available set of sidelink resource candidates further comprise:
means for determining that the duplex mode of the UE comprises a full-duplex mode while measuring the reference signaling in the sensing window;
means for measuring the reference signaling according to the first channel metric to obtain a first measurement based at least in part on the full-duplex mode of the UE, wherein the first measurement is below the first threshold value; and
means for determining the available set of sidelink resource candidates based at least in part on the first channel metric and the first measurement being below the first threshold value.

30. A non-transitory computer-readable medium storing code for wireless communications at a user equipment (UE), the code comprising instructions executable by a processor to:
receive control signaling indicating a configuration for performing a channel sensing procedure of a sidelink resource selection procedure for identifying sidelink resource candidates in a resource selection window, wherein the configuration indicates a first channel metric for the channel sensing procedure and a second channel metric for the channel sensing procedure that is different than the first channel metric;
measure reference signaling in a sensing window according to the first channel metric, the second channel metric, or both, based at least in part on a duplex mode of the UE while measuring the reference signaling in the sensing window, wherein the reference signaling in the sensing window corresponds to a set of sidelink resource candidates in the resource selection window;
determine an available set of sidelink resource candidates from the set of sidelink resource candidates based at least in part on the measuring; and
transmit a sidelink message using one or more resources of the available set of sidelink resource candidates.

* * * * *